(12) United States Patent
Vincent et al.

(10) Patent No.: US 10,825,247 B1
(45) Date of Patent: Nov. 3, 2020

(54) PRESENTING INTEGRATED BUILDING INFORMATION USING THREE-DIMENSIONAL BUILDING MODELS

(71) Applicant: Zillow Group, Inc., Seattle, WA (US)

(72) Inventors: Joshuah Vincent, Seattle, WA (US); Ivaylo Boyadzhiev, Seattle, WA (US); Romualdo Impas, Seattle, WA (US); Yuguang Li, Seattle, WA (US); Pierre Moulon, Seattle, WA (US)

(73) Assignee: Zillow Group, Inc., Seattle, WA (US)

( * ) Notice: Subject to any disclaimer, the term of this patent is extended or adjusted under 35 U.S.C. 154(b) by 0 days.

(21) Appl. No.: 16/681,787

(22) Filed: Nov. 12, 2019

(51) Int. Cl.
*G06T 19/00* (2011.01)
*G06T 17/05* (2011.01)
*G06F 3/0482* (2013.01)
*G06T 15/50* (2011.01)

(52) U.S. Cl.
CPC .......... *G06T 19/003* (2013.01); *G06F 3/0482* (2013.01); *G06T 15/506* (2013.01); *G06T 17/05* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 5,140,352 A | 8/1992 | Moore et al. | |
| 6,031,540 A | 2/2000 | Golin et al. | |
| 6,141,034 A | 10/2000 | McCutchen | |
| 6,317,166 B1 | 11/2001 | McCutchen | |
| 6,320,584 B1 | 11/2001 | Golin et al. | |
| 6,323,858 B1 | 11/2001 | Gilbert et al. | |

(Continued)

FOREIGN PATENT DOCUMENTS

| | | |
|---|---|---|
| EP | 2413097 A2 | 2/2012 |
| EP | 2505961 A2 | 10/2012 |

(Continued)

OTHER PUBLICATIONS

CubiCasa | From video to floor plan in under 5 minutes, retrieved on Mar. 26, 2019, from https://www.cubi.casa/, 6 pages.

(Continued)

*Primary Examiner* — Martin Mushambo
(74) *Attorney, Agent, or Firm* — VLP Law Group LLP; James A. D. White

(57) ABSTRACT

Automated operations related to providing visual information of multiple types in an integrated manner about a building or other defined area may include generating and presenting a GUI (graphical user interface) on a client device that includes a computer model of the building's interior with one or more first types of information (e.g., in a first pane of the GUI), and simultaneously presenting other types of related information about the building interior (e.g., in additional separate GUI pane(s)) that is coordinated with the first type(s) of information being currently displayed. The computer model may be a 3D (three-dimensional) or 2.5D representation generated after the house is built and showing the actual house's interior (e.g., walls, furniture, etc.), and may be displayed to a user of a client computing device in a displayed GUI with various user-selectable controls.

31 Claims, 18 Drawing Sheets

(56) References Cited

U.S. PATENT DOCUMENTS

| | | |
|---|---|---|
| 6,337,683 B1 | 1/2002 | Gilbert et al. |
| 6,580,441 B2 * | 6/2003 | Schileru-Key ...... G06F 3/04815 705/27.1 |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper et al. |
| 3,463,020 A1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,395,435 B2 | 8/2019 | Powers et al. |
| 2006/0256109 A1 * | 11/2006 | Acker ...................... G06T 15/20 345/419 |
| 2008/0028328 A1 * | 1/2008 | Hoizal ...................... G06F 8/38 715/763 |
| 2008/0263465 A1 * | 10/2008 | Fox ........................ G06F 16/285 715/764 |
| 2010/0005427 A1 * | 1/2010 | Zhang ...................... G06F 3/044 715/863 |
| 2010/0131857 A1 * | 5/2010 | Prigge ...................... G06F 8/10 715/744 |
| 2010/0232709 A1 * | 9/2010 | Zhang ...................... G06T 7/77 382/201 |
| 2012/0075414 A1 | 3/2012 | Park et al. |
| 2012/0293613 A1 | 11/2012 | Powers et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0068445 A1 * | 3/2014 | Kempf ............. G06Q 10/06312 715/736 |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 * | 8/2014 | Dorum ...................... G01C 21/34 701/533 |
| 2014/0267631 A1 | 9/2014 | Powers et al. |
| 2014/0307100 A1 | 10/2014 | Myllykoski et al. |
| 2015/0116691 A1 | 4/2015 | Likholyot |
| 2015/0153182 A1 * | 6/2015 | Tu ........................ G06F 1/1694 715/771 |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Amoldus et al. |
| 2015/0310596 A1 * | 10/2015 | Sheridan ................. G06F 16/29 382/284 |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 * | 9/2016 | Rondinelli ........... H04N 5/2254 |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0025536 A1 | 1/2018 | Bell et al. |
| 2018/0139431 A1 | 5/2018 | Simek |
| 2018/0143023 A1 | 5/2018 | Bjorke |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |

(56) References Cited

U.S. PATENT DOCUMENTS

| | | |
|---|---|---|
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hoyden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016/154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGUIDE: 3D Virtual Tours, retrieved on Mar. 26, 2019, from https://goiguide.com/, 6 pages.

Immoviewer.com | Automated Video Creation & Simple Affordable 3D 360 Tours, retrieved on Mar. 26, 2019, from https://www.immoviewer.com/, 5 pages.

MagicPlan = #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.pinar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "Flow to Make a 3-D Model of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing," in Proceedings of the 13th ACM Conference on Embedded Networked Sensor Systems, Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved on Mar. 27, 2017 from http://geojournalism.org/2015/02/create-immersive-photo-experiences-with-google-photo-sphere/, 7 pages.

* cited by examiner

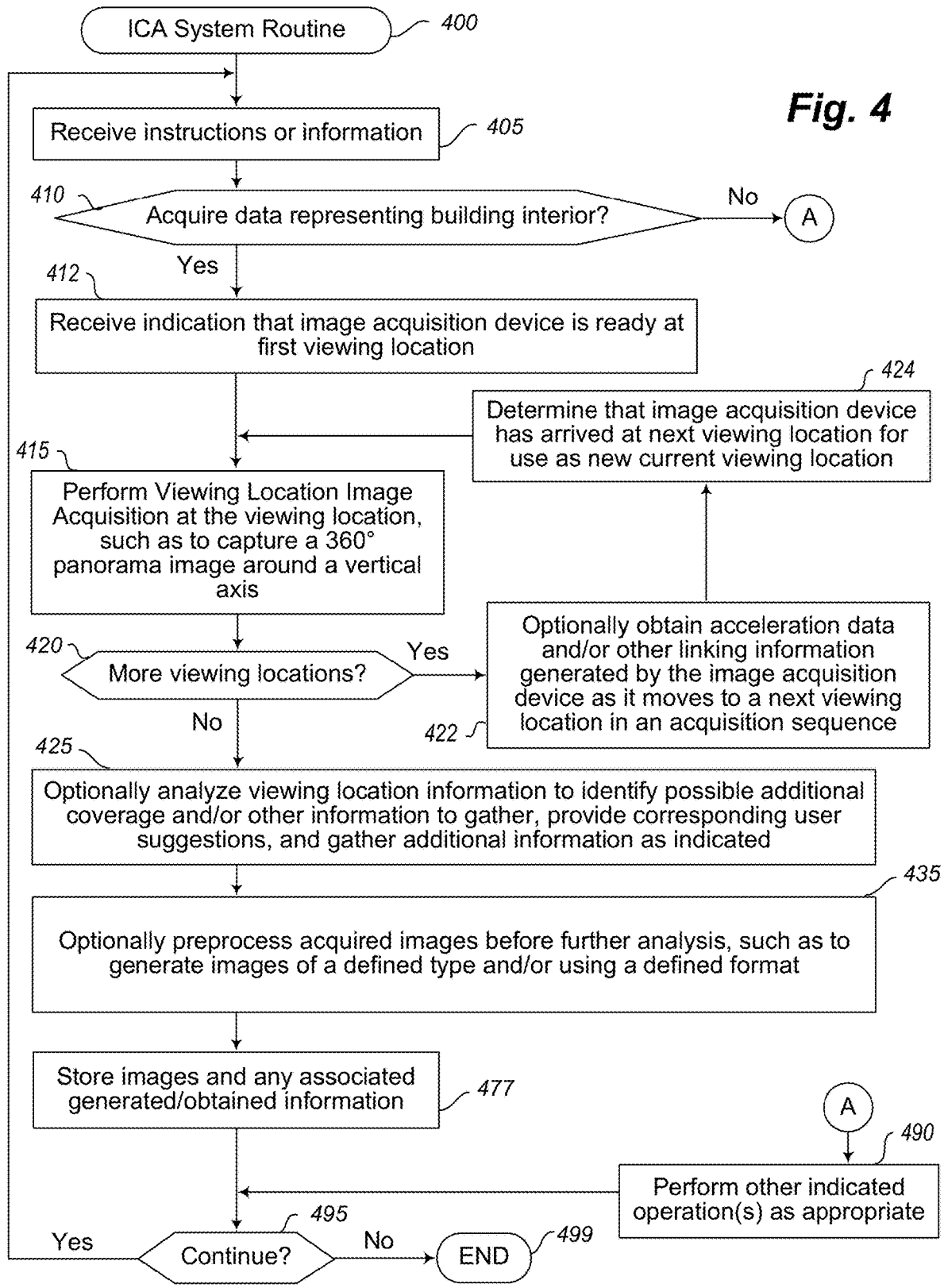

PRESENTING INTEGRATED BUILDING INFORMATION USING THREE-DIMENSIONAL BUILDING MODELS

TECHNICAL FIELD

The following disclosure relates generally to techniques for providing visual information of multiple types about a defined area in an integrated manner, such as to present a three-dimensional computer model of an interior of an as-built building along with multiple other types of information about the building interior in a simultaneous and coordinated manner.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult or impossible to effectively display visual information about building interiors to users at remote locations, such as to enable a user to fully understand the layout and other details of the interior, including under varying conditions.

BRIEF DESCRIPTION OF THE DRAWINGS

FIG. 4 illustrates an example embodiment of a flow diagram for an Image Capture and Analysis (ICA) system routine in accordance with an embodiment of the present disclosure.

DETAILED DESCRIPTION

Figure 1A:
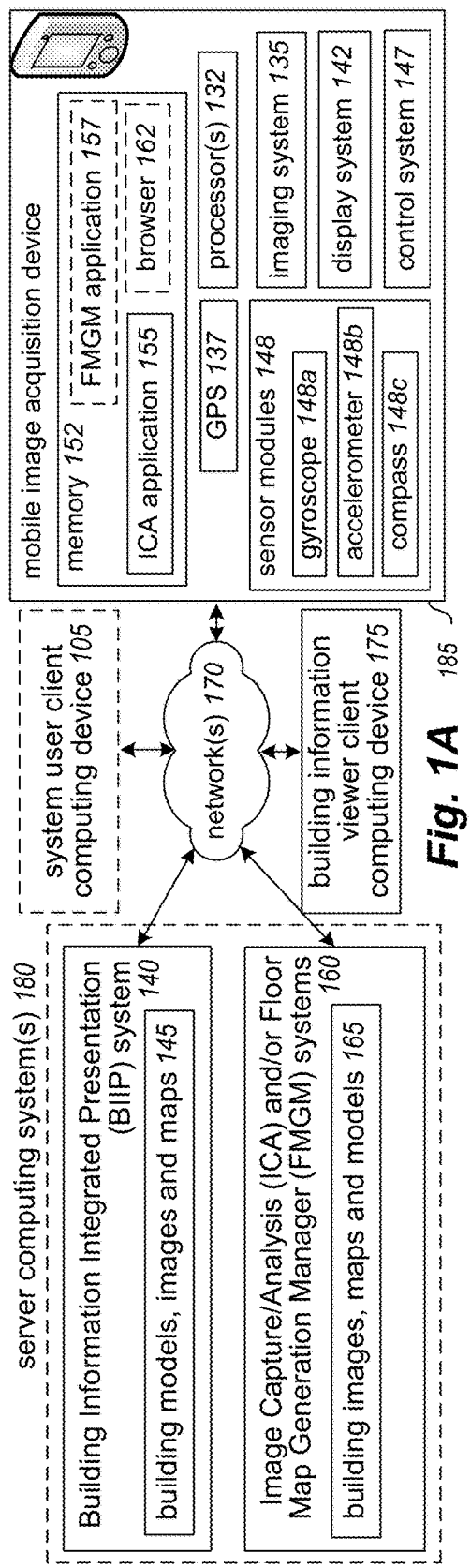
FIGS. 1A-1B are diagrams depicting an exemplary building interior environment and computing system(s) for use in embodiments of the present disclosure, including to generate and present information representing the building interior.

The present disclosure describes techniques for using one or more computing devices to perform automated operations related to providing visual information of multiple types about a defined area in an integrated manner, such as information about a building and by using a computer model of the building's interior. In at least some embodiments, the techniques include generating and presenting a GUI (graphical user interface) on a client device that includes a visual representation of a computer model of the building's interior with one or more first types of information (e.g., in a first pane of the GUI), and to simultaneously present other types of related information about the building interior (e.g., in one or more additional separate panes of the GUI) that is coordinated with the first type(s) of information being currently displayed. The building may, for example, be a house, the computer model of the building's interior may be a 3D (three-dimensional) or 2.5D (two and a half dimensional) representation that is generated after the house is built and that shows the house's actual interior (e.g., walls, windows, doors, stairs, fireplaces, kitchen islands, cabinets, counters, lighting and/or plumbing fixtures and associated built-in elements such as sinks and showers/baths, curtains, wall paper or paint, floor coverings, etc.), and the types of presented information about the building interior may include panorama images (e.g., 360° panorama images with 360° of coverage around a vertical axis), 2D (two-dimensional) perspective photos and other images, videos, an interactive tour of inter-connected viewing/capture locations, and various other types of information. Additional details are included below regarding the automated operations of the computing device(s) involved in the generating and presenting of the various types of coordinated information about a building's interior, and some or all of the techniques described herein may, in at least some embodiments, be performed at least in part via automated operations of a Building Information Integrated Presentation ("BIIP") system, as discussed further below.

The types of information that are presented in a simultaneous and coordinated manner about a building's interior (and in some cases surroundings) may have various forms in various embodiments, and may be acquired in various manners. In addition, at least some of those types of information may be associated with corresponding positions in a computer model of the building (e.g., a 3D model with full height information represented, a 2.5D model with partial representations of height represented, etc.). As one example, types of additional information about a building may include one or more of the following, and may be associated with locations from which the information was captured and/or locations that are shown or otherwise represented in the captured information: photos or other images (e.g., 2D perspective images, 360 panorama images and/or other panorama images, etc.), such as to be associated with viewing locations (also referred to at times as 'capture locations' or 'recording locations' or 'viewing/capture locations') within the rooms of the building where they were taken; video recordings, such as to each include a sequence of multiple images and to be associated with viewing locations within the rooms of the building where they were taken; textual and/or audio annotations or other descriptions of particular points of interest (POIs) in the building's rooms or other locations; other audio information, such as recordings of ambient noise that are associated with recording locations within the rooms of the building where they were taken; a time-lapse or other accelerated video and/or animation of an area in or around a home, such as from a front door and/or front window of a house to show traffic or other information over a first period of time (e.g., 1 hour, 4 hours, 8 hours, 12 hours, 24 hours, etc.) that is presented over a shorter period of time (e.g., 10 seconds, 30 seconds, 1 minute, 5 minutes, 10 minutes, etc.); other external information from an environment surrounding the building, such as about nearby buildings and/or vegetation (e.g., as identified from satellite or other external images of the building, such as taken from the building and/or from a nearby street or yard; as identified from data in one or more external databases or other information sources, such as street maps or other government records; etc.), whether by displaying the actual images or by generating and displaying visual representations of particular external elements that are identified and modeled from images or other external information sources; lighting information for an interior of a building and/or its surroundings, such as simulated lighting for one or more rooms of a building (e.g., to simulate daylight entering the one or more rooms at one or more defined times, to show actual lighting from interior lights in the one or more rooms at one or more defined times; etc.); in-room images for a room that are projected on the walls of the room shown in the model; user-generated and/or 'crowd-sourced' information provided by one or more end users about the building, such as interior and/or exterior images, descriptions, questions, answers, etc. that are associated with particular rooms or locations within rooms; estimated scale information such as room width, length and/or height dimensions; geographical location and/or orientation information for the building; a 2D (two-dimensional) floor map of the building interior, such as using an overhead schematic view (e.g., an orthographic top view); etc. Additional details are included elsewhere herein regarding types of information that may be presented about a building in a coordinated and simultaneous manner, such as to displayed for a computer model of an interior of a house or other building in a displayed GUI.

In addition, the automated operations may include controlling how multiple types of information are presented in various embodiments in a simultaneous and coordinated manner about a building's interior (and in some cases, the building's surroundings). In at least some embodiments, such automated operations include presenting a GUI with multiple panes that are simultaneously displayed, and with each pane including information of a different type that are all related to a common location or area in the building interior or other common aspect/feature of the building interior. As one non-exclusive example, a first pane may be displaying a photo taken in a room of the building to show at least some of that room, a second pane may be displaying a portion of a 3D computer model of the building that includes the room, and a third pane may be displaying a video taken within the room or a part of an interactive tour of the building that includes one or more viewing locations situated within the room—in addition, in at least some embodiments, one of the panes may be a primary pane (e.g., that is larger than other secondary panes, and/or that has user-selectable controls via which the user may interact with the content shown in that pane in various manners), and the GUI may further enable the user to easily switch content between the primary pane and one of the secondary panes, or to otherwise change information shown in one or more of the panes.

Various user-selectable controls may also be displayed in or otherwise associated with one or more of the displayed panes (e.g., with the primary pane, and optionally in a contextual manner based on the type of content displayed in the primary pane) and provide functionality to make various types of modifications to the displayed information, such as one or more of the following: to change the contents of a secondary pane to a primary pane; to change the contents of the primary pane or a secondary pane to another type of information that is not currently displayed, with the new information of the other type similarly being coordinated with the content currently displayed in the other panes; to toggle on and off one or more additional types of information that are overlaid on the contents of a pane, such as textual and/or audio descriptions, information about points of interest, questions and/or answers, lighting information, etc.; to add user-specified content (e.g., a photo, a description, a question, etc.) to the content of a particular pane and/or to a location of the building shown in that pane; etc. Additional details are included elsewhere herein regarding the presentation of multiple types of information about a building in a simultaneous and coordinated manner, including about types of user-selectable controls and other user selections in a displayed GUI.

The described techniques provide various benefits in various embodiments, including to use 3D models and/or 2.5D models and/or 2D floor maps of multi-room buildings and other structures (e.g., that are generated from images acquired in the buildings or other structures) to display various types of information about building interiors in a coordinated and simultaneous manner with other types of related information, including to use information about the actual as-built buildings (e.g., internal structural components and/or other interior elements, nearby external buildings and/or vegetation, actual building geographical location and/or orientation, actual typical weather patterns, etc.) rather than using information from plans on how the building is designed and should theoretically be constructed. Such described techniques may further provide benefits in at least some embodiments for allowing improved automated navigation of a building by mobile devices (e.g., semi-autonomous or fully-autonomous vehicles) via use of information of various types, including to significantly reduce their computing power used and time used to attempt to otherwise learn a building's layout. In addition, in some embodiments the described techniques may be used to provide an improved GUI in which an end user may more accurately and quickly obtain information about a building's interior (e.g., for use in navigating that interior, such as via a virtual interactive tour), including in response to search requests, as part of providing personalized information to the end user, as part of providing value estimates and/or other information about a building to an end user, etc. Various other benefits are also provided by the described techniques, some of which are further described elsewhere herein.

For illustrative purposes, some embodiments are described below in which specific types of information are acquired, generated, used and/or presented in specific ways for specific types of structures and by using specific types of devices—however, it will be understood that the described techniques may be used in other manners in other embodiments, and that the invention is thus not limited to the exemplary details provided. As one non-exclusive example, while various types of information related to house interiors may be used in some situations, it will be appreciated that one or more of such information types may be similarly used in other embodiments for other types of buildings (or other structures or layouts) separate from houses and/or for other parts of a house or other building (e.g., for external walls; surrounding yards; surrounding supplemental structures, such as a garage, shed, barn, etc.; roofs; etc.). As another example, while various types of information for models of houses or other buildings may be used for display to assist viewers in navigating the buildings or otherwise understanding the buildings' interiors, at least some such types of information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 1B:
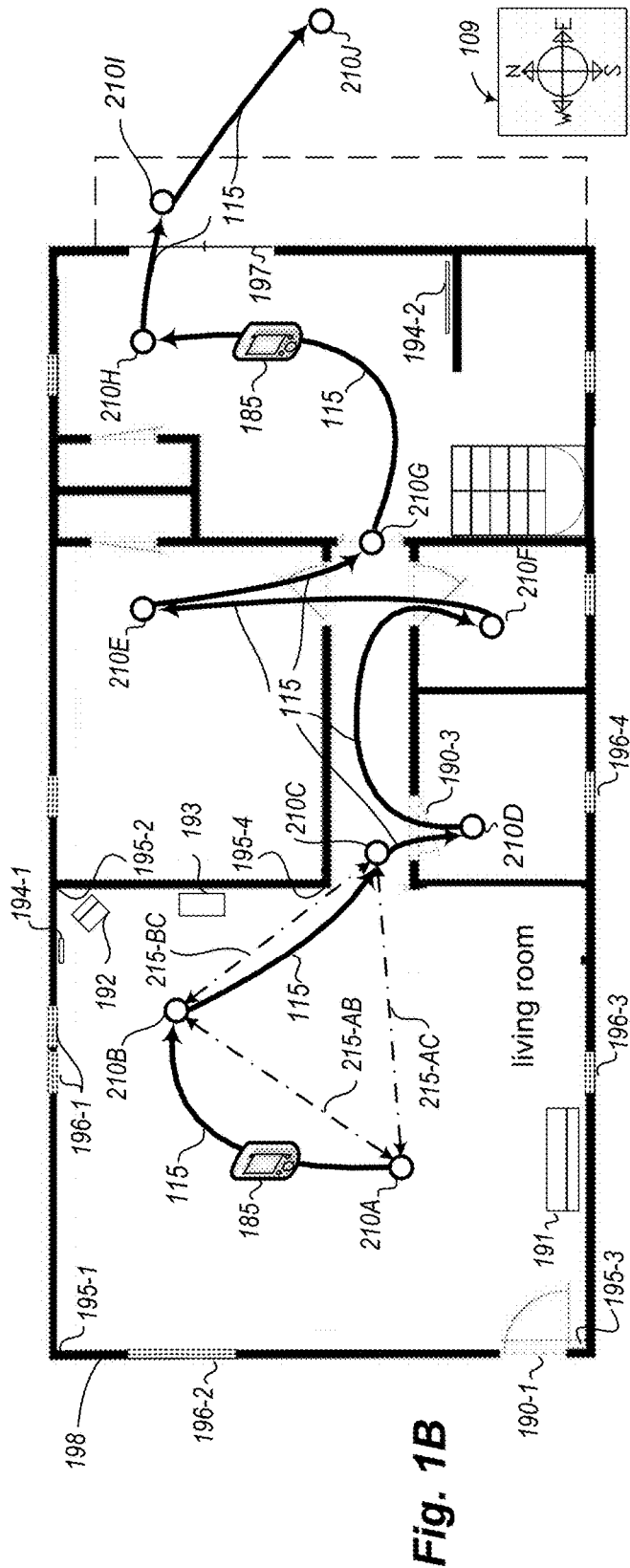

FIG. 1A is an example block diagram of various computing devices and systems that may participate in the described techniques in some embodiments. In particular, an Interior Capture and Analysis ("ICA") system (e.g., a system 160 that is executing on one or more server computing systems 180, and/or a system provided by application 155 executing on one or more mobile image acquisition devices 185) has acquired images 165 (e.g., 360° spherical panorama images in equirectangular format), such as with respect to one or more buildings or other structures (not shown in FIG. 1A), and a Floor Map Generation Manager ("FMGM") system (e.g., a system 160 that is executing on one or more server computing systems 180, and/or a system provided by application 157 executing on one or more mobile image acquisition devices 185) has used the acquired images 165 and optionally other information to generate one or more 2D floor maps 165 and/or computer models 165 (e.g., 3D and/or 2.5D models) for the one or more buildings or other structures. FIG. 1B shows one example of acquisition of panorama images for a particular house at multiple capture/viewing locations 210, and FIGS. 2A-2L illustrate additional details about using a computer model generated from such panorama images to control how multiple types of information are presented in a simultaneous and coordinated manner about the house, as discussed further below.

A BIIP (Building Information Integrated Presentation) system 140 is further executing on one or more server computing systems to use building models, maps and images 145 (e.g., acquired from the information 165) and/or other mapping-related information or associated information (not shown) in order to control the simultaneous and coordinated presentation of multiple types of information (including such building models 145) about the house or other building. As part of doing so, the BIIP system may receive requests or instructions or other information via computer network(s) 170 from end users of building information viewer client computing devices 175 about types of information to include, before generating and providing such information for display on the client computing devices 175, and may further optionally obtain and use supporting information supplied by BIIP system operator users via computing devices 105 and intervening computer network(s) 170 to configure or modify operations of the BIIP system in some embodiments. Additional details related to the automated operation of the BIIP system are included elsewhere herein, including with respect to FIGS. 2A-2L and FIG. 6. In some embodiments, the ICA system(s) 160 and/or FMGM system(s) 160 and/or BIIP system 140 may execute on the same server computing system(s), such as if two or more of the systems are operated by a single entity or are otherwise executed in coordination with each other (e.g., with some or all functionality of such systems integrated together into a larger system), while in other embodiments the BIIP system may instead operate separately from such an ICA system (e.g., without an ICA system by instead obtaining panorama images or other images from one or more external sources) and/or may instead operate separately from such an FMGM system (e.g., without an FMGM system by instead obtaining 2D floor maps or other computer models of buildings from one or more external sources).

Various components of the mobile image acquisition device 185 are illustrated in FIG. 1A, including a browser 162 and/or an ICA system application 155 and/or an FMGM system application 157 that are executed in memory 152 of the device 185 by one or more hardware processors 132, and including one or more imaging systems 135 to acquire visual data. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), optionally a GPS (or Global Positioning System) sensor 137 or other position determination sensor (not shown in this example), a display system 142, a control system 147 to control acquisition of images (e.g., to rotate the mobile device), etc. Other computing devices/systems 105, 175 and 180 may include various hardware components and stored information in a manner analogous to mobile device 185, but are not shown in this example for the sake of brevity, although some related further details are discussed below with respect to FIG. 3.

In the example of FIG. 1A, the ICA system may perform automated operations involved in acquiring multiple images at multiple associated viewing locations (e.g., in multiple rooms or other locations within a building or other structure and optionally around some or all of the exterior of the building or other structure), such as using visual data acquired via the mobile device(s) 185, and for subsequent use in generating and providing a representation of an interior of the building or other structure. For example, in at least some such embodiments, such techniques may include using one or more mobile devices (e.g., a camera having one or more fisheye lenses or other lenses that simultaneously capture 360° horizontally around a vertical axis, such as to produce a 360° spherical panorama image without rotation; a camera having one or more fisheye lenses or other lenses that capture less than 360° horizontally at a given time, and that is mounted on a rotatable tripod or otherwise having an automated rotation mechanism to enable 360° image capture over a period of time corresponding to the rotation; a smart phone held and moved by a user, such as to rotate the user's body and held smart phone in a 360° circle around a vertical axis; a camera held by or mounted on a user or the user's clothing; a camera mounted on an aerial and/or ground-based drone or robotic device; etc.) to capture data from a sequence of multiple viewing locations within multiple rooms of a house (or other building), and to optionally further capture data involved in movement or travel between some or all of the viewing locations for use in linking the multiple viewing locations together, but without having distances between the viewing locations being measured or having other measured depth information to objects in an environment around the viewing locations (e.g., without using any depth-sensing sensors). After a viewing location's information is captured, the techniques may include producing a panorama image from that viewing location (e.g., a 360° panorama image that includes 360° of horizontal coverage around a vertical axis, a 360° spherical panorama image that further shows the surrounding room in an equirectangular format, another type of panorama image in another format, etc.), and then providing the panorama images for subsequent use by an FMGM system and/or BIIP system. Additional details related to embodiments of a system providing at least some such functionality of an ICA system are included in U.S. Non-Provisional patent application Ser. No. 16/236,187, filed Dec. 28, 2018 and entitled "Automated Control Of Image Acquisition Via Use Of Acquisition Device Sensors"; in U.S. Non-Provisional patent application Ser. No. 16/190,162, filed Nov. 14, 2018 and entitled "Automated Mapping Information Generation From Inter-Connected Images"; and in U.S. Non-Provisional patent application Ser. No. 15/649,434, filed Jul. 13, 2017 and entitled "Connecting And Using Building Interior Data Acquired From Mobile Devices" (which includes disclosure of a BICA system that is one example embodiment of an ICA system generally directed to obtaining and using panorama images from within one or more buildings or other structures); each of which is incorporated herein by reference in its entirety.

In the example of FIG. 1A, the FMGM system may perform automated operations involved in using images acquired at multiple associated viewing locations (e.g., in multiple rooms or other locations within a building or other structure and optionally around some or all of the exterior of the building or other structure) to generate a 2D floor map for the building or other structure and/or to generate a computer model for the building or other structure (e.g., a 3D model and/or a 2.5D model), such as by analyzing visual information available in the images, and for providing a representation of an interior of the building or other structure (e.g., for subsequent use in controlling the simultaneous and coordinated presentation of multiple types of information about the interior of the building or other structure. For example, in at least some such embodiments, such techniques may include analyzing one or more images taken in a room to determine a shape of the room and/or to identify inter-room passages (e.g., doorways and other openings in walls) into and/or out of the room. After the shapes of some or all of the rooms are determined, the techniques may further include positioning the room shapes relative to each other to form a 2D floor map (e.g., based at least in part on connecting inter-room passages between rooms, and optionally using travel or other movement information captured between the viewing locations to determine relative locations of the viewing locations with respect to each other), optionally combined with height and/or other size information to generate a 3D and/or 2.5D model of the building or other structure, and then providing the generated computer model(s) and optionally 2D floor map for subsequent use by the BIIP system. Additional details related to embodiments of a system providing at least some such functionality of an FMGM system are included in U.S. Non-Provisional patent application Ser. No. 16/190,162, filed Nov. 14, 2018 and entitled "Automated Mapping Information Generation From Inter-Connected Images"; and in U.S. Provisional Patent Application No. 62/893,108, filed Aug. 28, 2019 and entitled "Automated Tools For Generating Mapping Information For Buildings" (which includes disclosure of an MIGM system that is one example embodiment of a FMGM system generally directed to generating floor maps and other computer models for one or more buildings or other structures based in part of input from one or more system operator users); each of which is incorporated herein by reference in its entirety.

One or more end users (not shown) of one or more building information viewer client computing devices 175 may each further interact over computer networks 170 with the BIIP system 140 (and optionally the ICA system 160 and/or FMGM system 160), such as to obtain, display and interact with a generated computer model and/or floor map that are part of multiple types of information about the house or other building being presented in a simultaneous and coordinated manner in a GUI displayed on a device 175 (e.g., based at least in part on user-specified conditions). In addition, while not illustrated in FIG. 1A, a computer model (or portion of it) and/or floor map may be linked to or otherwise associated with one or more additional types of information, such as one or more associated and linked images or other associated and linked information, including for a two-dimensional ("2D") floor map of a building to be inter-linked with or otherwise associated with a separate 2.5D model rendering of the building and/or a 3D floor plan model rendering of the building, etc., and including for a computer model and/or floor map of a multi-story or otherwise multi-level building to have multiple associated sub-floor models or maps for different stories or levels that are interlinked (e.g., via connecting stairway passages). Accordingly, non-exclusive examples of an end user's interactions with a displayed or otherwise generated computer model (e.g., a 2.5D or 3D model view that optionally includes images texture-mapped to walls of the displayed model) and/or 2D floor map of a building may include one or more of the following: to change between a computer model view and a floor map view (collectively referred to herein as one or more mapping views); to change between a mapping view and a view of a particular image at a viewing location within or near the building's interior; to change the horizontal and/or vertical viewing direction from which a corresponding subset view of (or portal into) a panorama image is displayed, such as to determine a portion of a panorama image in a 3D spherical coordinate system to which a current user viewing direction is directed, and to render a corresponding planar image that illustrates that portion of the panorama image without the curvature or other distortions present in the original panorama image; etc. Additional details regarding embodiments of a system providing at least some such functionality of a BIIP system (such as to provide or otherwise support at least some functionality to an end user using a building information viewer system and routine as discussed herein) are included in U.S. Non-Provisional patent application Ser. No. 15/950,881, filed Apr. 11, 2018 and entitled "Presenting Image Transition Sequences Between Viewing Locations" (which includes disclosure of an ILTM system that is one example embodiment of a BIIP system generally directed to generating and displaying transitions between images captured at different viewing locations); and in U.S. Provisional Patent Application No. 62/911,959, filed Oct. 7, 2019 and entitled "Providing Simulated Lighting Information For Three-Dimensional Building Models" (which includes disclosure of a BMLSM system that is one example embodiment of a BIIP system generally directed to generating and displaying simulated lighting information in a three-dimensional model of a building's interior); each of which is incorporated herein by reference in its entirety. In addition, while not illustrated in FIG. 1A, in some embodiments the client computing devices 175 (or other devices, not shown) may receive and use generated computer models and/or other generated mapping-related information in additional manners, such as to control or assist automated navigation activities by those devices (e.g., by autonomous vehicles or other devices), whether instead of or in addition to display of the generated information.

In the depicted computing environment of FIG. 1A, the network 170 may be one or more publicly accessible linked networks, possibly operated by various distinct parties, such as the Internet. In other implementations, the network 170 may have other forms, such as to instead be a private network (such as a corporate or university network) that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks and connections in various situations.

FIG. 1B depicts a block diagram of an exemplary building interior environment in which images are acquired and for which one or more computer models and/or 2D floor maps are generated, such as for further use by the BIIP system to control the simultaneous and coordinated presentation of multiple types of information about the interior of the house, as discussed in greater detail with respect to FIGS. 2A-2L, as well as for use in some embodiments in otherwise presenting the computer models and/or floor maps and/or images to users. In particular, FIG. 1B illustrates a first story of a multi-story building 198 (e.g., with a partial or full basement and/or a second story, not shown) with an interior that was captured at least in part via multiple panorama images, such as by a mobile image acquisition device 185 with image acquisition capabilities as it is moved through the building interior to a sequence of multiple viewing locations 210 (e.g., starting at viewing location 210A, moving to viewing location 210B along travel path 115, etc.). An embodiment of the ICA system (e.g., ICA system 160 on server computing system(s) 180, a copy 155 of some or all of the ICA system executing on the mobile image acquisition device 185, etc.) may automatically perform or assist in the capturing of the data representing the building interior, as well as to further analyze the captured data to generate panorama images to provide a visual representation of the building interior, and an embodiment of the FMGM system (e.g., FMGM system 160 on server computing system(s) 180, a copy 157 of some or all of the FMGM system executing on the mobile image acquisition device 185, etc.) may automatically perform or assist in the generation of one or more computer models and/or a 2D floor map representing the building interior. While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their viewing locations may be determined in part or in whole based on features in different images, but without using any data from any such depth sensors. In addition, while geographical orientation/directional indicator 109 is provided in FIG. 1B for reference of the viewer, the mobile device and/or ICA system and/or FMGM system may not use such absolute directional information in at least some embodiments, such as to instead determine relative directions and distances between viewing locations 210 without regard to actual geographical positions or directions in such embodiments.

In operation, the mobile image acquisition device 185 arrives at a first viewing location 210A within a first room of the building interior (in this example, in a living room accessible via an external door 190-1), and captures a view of a portion of the building interior that is visible from that viewing location 210A (e.g., some or all of the first room, and optionally small portions of one or more other adjacent or nearby rooms, such as through doors, halls, stairs or other connecting passages from the first room). The view capture may be performed in various manners as discussed herein, and may capture information about a number of objects or other features (e.g., structural details) that are visible in images captured from the viewing location—in the example of FIG. 1B, such objects or other features throughout the house include the doorways 190 (including 190-1 and 190-3) and 197 (e.g., with swinging and/or sliding doors), windows 196 (including 196-1, 196-2, 196-3 and 196-4), corners or edges 195 (including corner 195-1 in the northwest corner of the building 198, corner 195-2 in the northeast corner of the first room, corner 195-3 in the southwest corner of the first room, corner 195-4 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures, various built-in appliances or fixtures (not shown), etc. The user may also optionally provide a textual or auditory identifier to be associated with a viewing location, such as "living room" for the room including viewing locations 210A and/or 210B and/or identifiers "entry" and "living room -NE" for the viewing locations 210A and 210B, respectively, while in other embodiments the ICA system and/or FMGM may automatically generate some or all such identifiers (e.g., by automatically analyzing video and/or other recorded information for a building to perform a corresponding automated determination, such as by using machine learning) or the BIIP system may determine such identifiers (e.g., based at least in part on input from BIIP system operator users and/or end users) or the identifiers may not be used.

After the first viewing location 210A has been adequately captured, the mobile device 185 may move or be moved to a next viewing location (such as viewing location 210B), optionally recording movement data such as video and/or other data from the hardware components (e.g., from one or more IMUs, from the camera, etc.) during movement between the viewing locations. At the next viewing location, the mobile device may similarly capture a panorama image from that viewing location. This process may repeat for some or all rooms of the building and optionally external to the building, as illustrated for viewing locations 210C-210J in this example. The acquired panorama images for each viewing location may be further analyzed, including in some embodiments to render or otherwise place each panorama image in an equirectangular format, whether at the time of image capture or later.

Various details are provided with respect to FIGS. 1A-1B, but it will be appreciated that the provided details are non-exclusive examples included for illustrative purposes, and other embodiments may be performed in other manners without some or all such details.

FIGS. 2A-2L illustrate examples of presenting a GUI that simultaneously displays multiple types of information about an interior of a building in an integrated and coordinated manner, such as for the building 198 and using images and their viewing/capture locations 210 discussed in FIG. 1B.

Figure 2A:
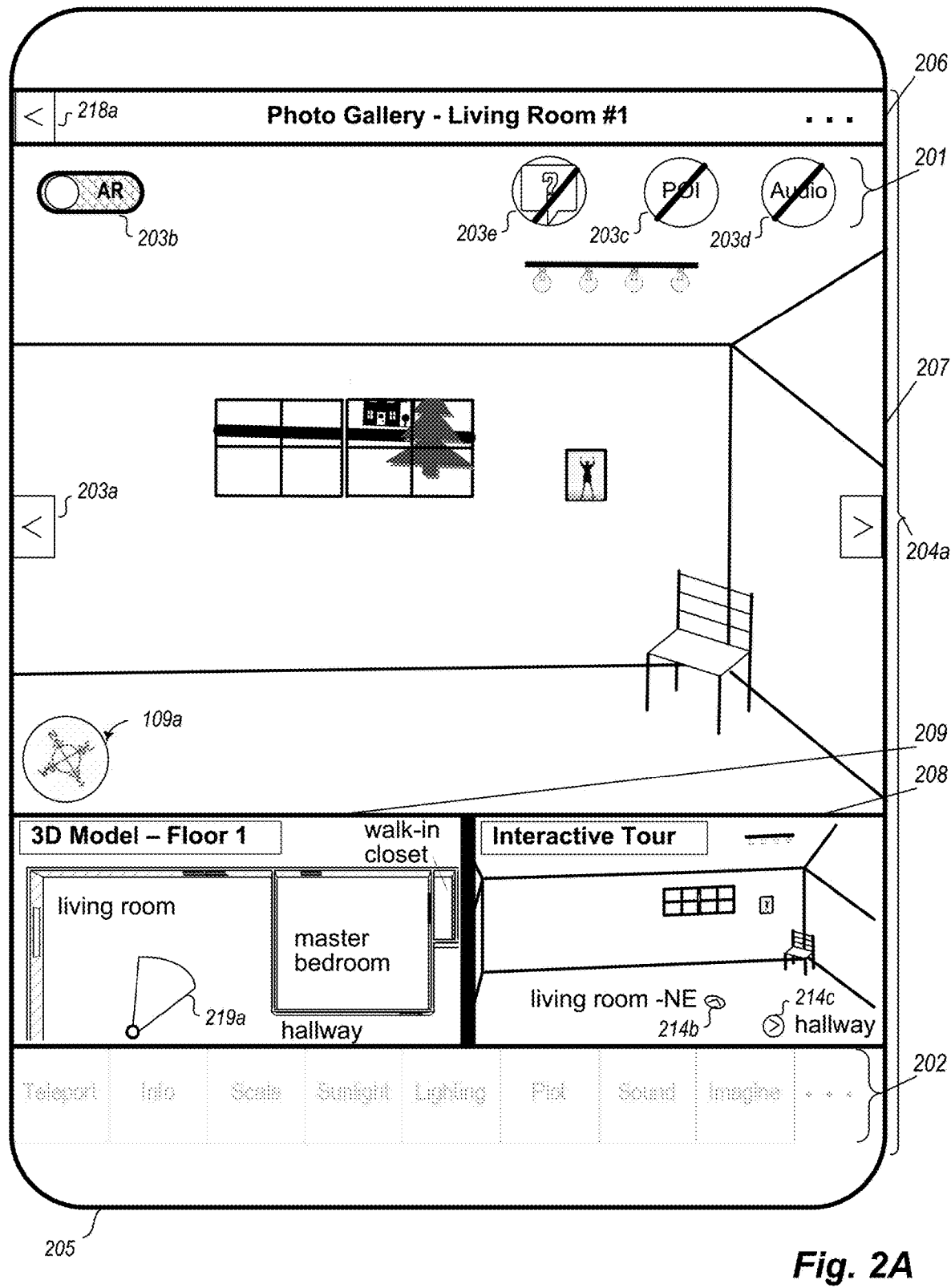
FIGS. 2A-2L illustrate examples of automated operations for presenting visual information that includes a 3D (three-dimensional) computer model of a building's interior along with multiple additional types of information about the building interior in a simultaneous and coordinated manner.

In particular, FIG. 2A illustrates an example embodiment of a GUI with various information 204a, which is displayed in this example on a mobile client device 205 (e.g., a smart phone or tablet), and which shows multiple types of information about a common area of example building 198. The GUI in this example includes a primary pane 207 and two secondary panes 208 and 209, with each of the panes showing information of a different type about the same area of the example house 198 shown in FIG. 1B. The primary pane 207 is showing an image taken from viewing location 210A in the living room in this example, with the direction of the image being in the northeast direction (as shown by visual indicator 109a overlaid on the primary pane, as well as the visual indicator 219a shown in secondary pane 209). In this example, the primary pane 207 also includes a header 206 that provides a description of the type of content shown (here, an image, as illustrated by the "photo gallery" label), as well as optionally having an additional label specific to the photo or other image being displayed (here, "Living Room #1").

The primary pane 207 may also have one or more user-selectable controls that enable the end user (not shown) to modify information being displayed in the GUI, such as control 218a in the header area 206 to change the type of information being shown in the primary pane to a different type of content (e.g., by cycling through each of the available types of content). In addition, other possible user-selectable controls 201 are overlaid on the primary pane, such as a toggle control 203c to show or hide information about points of interest that are present in the current image, a toggle control 203d to show or hide a description of the area of the house shown by the image, a toggle control 203e to show or hide information about questions and answers corresponding to the area of the house shown in the image and to optionally allow the end user to supply one or more additional questions or answers, a toggle control 203b to switch to a so-called "AR" (or augmented reality) mode in which tilting and rotating the body of the mobile device causes the displayed image to move accordingly (e.g., if the image shown in the primary pane is a 360° panorama image with only a subset of it currently shown, such that tilting to the left causes an additional portion of the panorama image to the left of the visible area to be shown, and with the control 203b not being shown if the content is not a panorama image), a selection control 203a to switch to another image in the photo gallery (e.g., to cycle through all available images), etc.—as discussed in greater detail elsewhere herein, in at least some embodiments and situations, some or all of the displayed user-selectable controls may be contextual based on a type of content currently shown in the primary pane (in this example, associated with image content).

In addition to the image shown in the primary pane of the northeast corner of the living room of the example house, the secondary panes 208 and 209 show other types of content about the same location or area of the example house. In particular, the secondary pane 209 in this example shows a portion of a 3D computer model of the house, and in particular shows a portion of the computer model that includes the northeast corner of the living room, as well as optionally including some or all of other parts of the same floor—as previously noted, the computer model is overlaid in this example with the visual indicator 219a to illustrate where the image shown in the primary pane was captured, and the orientation of the camera that captured the image. In addition, the secondary pane 208 in this example shows a portion of an interface to an interactive virtual tour of the house, with the interactive tour having a plurality of inter-connected viewing/capture locations at which images and/or other information that are available for viewing or other presentation were captured. In this example, the interface includes an image that was also captured from viewing location 210A (e.g., a panorama image captured from that viewing location), with the interface further including visual indicators 214b and 214c that each correspond to other viewing locations different from viewing location 210A (in particular, to viewing locations 210B and 210C of FIG. 1B, respectively)—as discussed in greater detail with respect to FIG. 2C, such visual indicators 214 may be user-selectable controls in at least some situations (e.g., when the interface to the interactive tour is shown in the primary pane) such that selection of one of the controls changes the image displayed to change to one from the viewing location associated with the selected control.

It will be appreciated that a variety of types of user interactions may occur with example embodiments of the GUI, such as to enable an end user (not shown) to select a secondary pane and cause its content to be moved to the primary pane, with new contents of that secondary pane being selected to correspond to the new primary pane contents (e.g., to move the contents that were in the primary pane to that secondary pane, to select a new content type to display in the secondary pane, etc.). Other optional user-selectable controls 202 are further shown in this example for reference purposes, although they may not be visible in some embodiments when three GUI panes are displayed as shown, such as if the controls 202 are associated with a different part of the GUI as discussed in greater detail with respect to FIG. 2F.

Figure 2B:
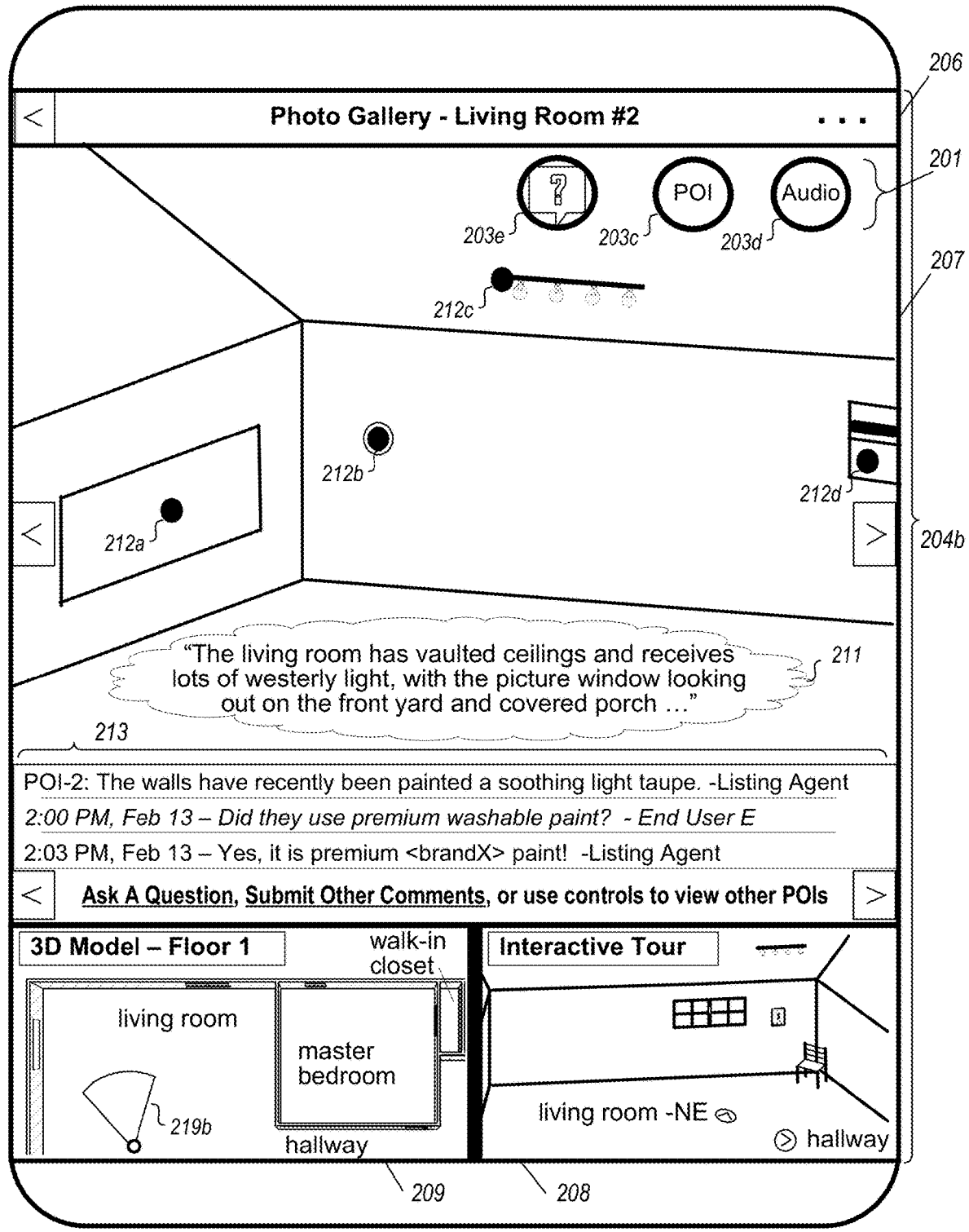

FIG. 2B continues the example of FIG. 2A, and in particular corresponds to the end user having selected the control 203a in FIG. 2A to change the image that is displayed in the primary pane to another image from the photo gallery. In this example, the new image displayed in the primary pane 207 as part of the updated information 204b in the updated GUI is also taken from the same viewing location 210A, but in a northwesterly direction (as illustrated by the updated visual indicator 219b shown in the 3D computer model of the secondary pane 209). In this example, the contents of the secondary pane 209 continue to be the same portion of the 3D computer model as in FIG. 2A (with the updated visual indicator 219b), which continues to correspond to the area of the house shown in the primary pane of FIG. 2B, and the contents of the secondary pane 208 continue to be the same portion of the interactive tour interface that correspond to the content of FIG. 2B as well (e.g., since the image in FIG. 2B continues to be taken from the same viewing/capture location as in FIG. 2A). It will be appreciated that the header portion 206 of the primary pane 207 is also updated in FIG. 2B to reflect the new image being shown in the primary pane, although in some embodiments such image-specific labels may not be used. It is also noted that the user-selectable controls 202 mentioned in FIG. 2A are not shown in FIG. 2B.

In addition, FIG. 2B further illustrates additional information that has been overlaid on the primary pane 207, based on selection by the end user of the user-selectable controls 203c, 203d and 203e in this example, although it will be appreciated that the end user may instead select only zero, one, or two of those three controls in other situations. In this example, selection of the user-selectable control 203c has caused several visual indicators 212 for points of interest in the room to be illustrated, with visual indicator 212b being currently selected and having a corresponding textual comment in the area 213 of the primary pane (to comment about paint on the walls of the room). Other visual POI indicators in this example include 212a on the west-facing picture window, 212d on the north-facing window, and 212c on the overhead track lighting on the ceiling. While the selected visual indicator 212b has associated text that is displayed in this example, other visual indicators for POIs may have other types of information associated, such as if the window visual indicators 212a and/or 212d have images and/or video associated with them, such as to show images or videos looking out the window (e.g., a time-lapse video over a 24-hour period of the exterior of the house from a window or door, such as to show road traffic or people traffic outside over that time period). In addition to the activation of the control 203c, the user-selectable control 203d has also been activated to provide an audio description of the area shown in the image, with the visual information 211 shown in this example representing audio information that may be audibly presented in response to the selection of that control (e.g., instead of having a textual representation of the information as shown in this example, or instead in addition to the textual information, such as if a closed captioning option is selected). Furthermore, the user-selectable control 203b corresponding to questions and answers is also selected, causing additional information in the area 213 to be shown, such as a question from another end user and a corresponding answer from a real estate listing agent for the house, as well as further user-selectable controls to allow the end user to ask a question to be answered, submit a comment for display to others, or to cycle through other existing questions and comments. It will be appreciated that illustrated types of information may be presented in other manners in other embodiments, or may not be shown.

Figure 2C:
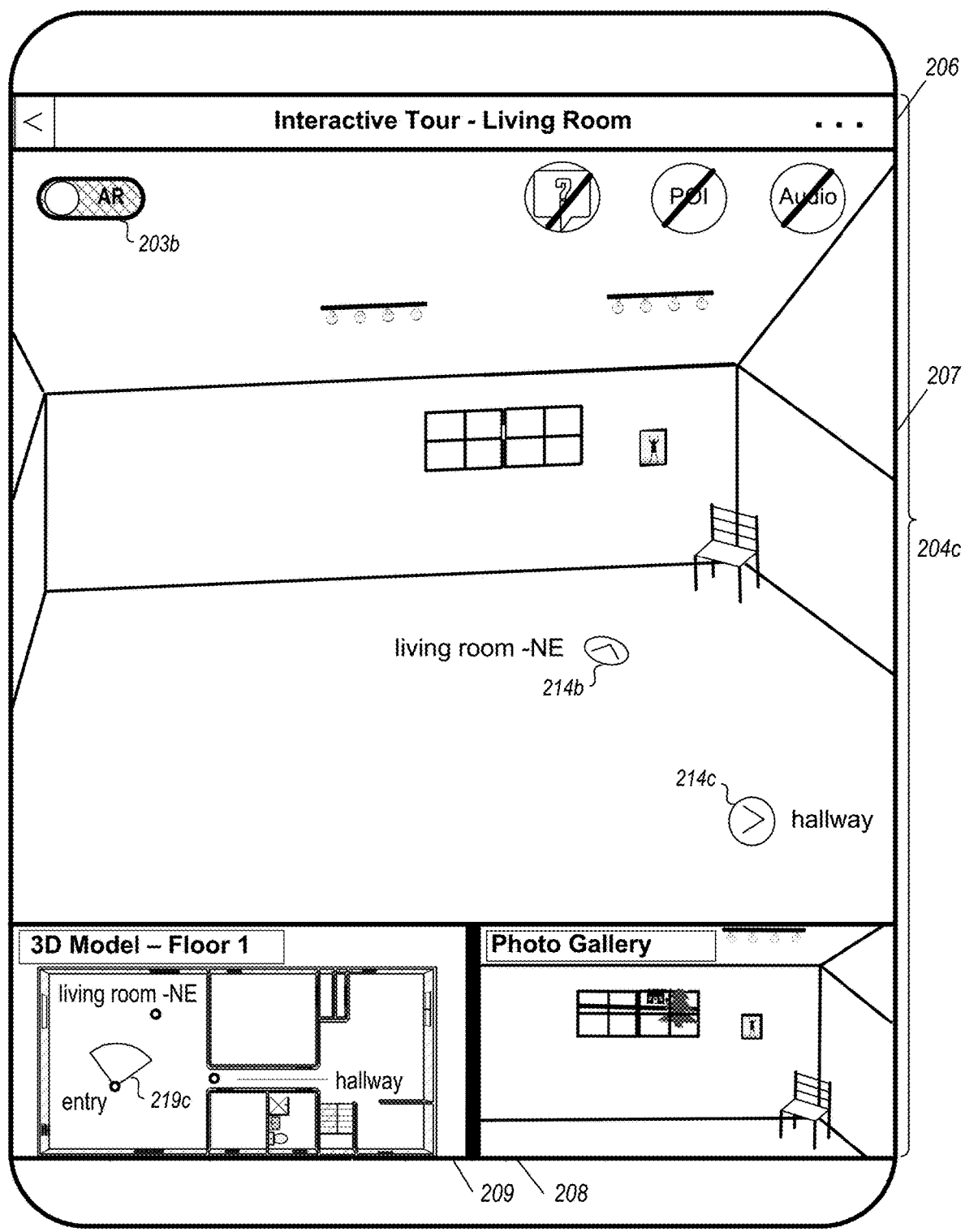
Figure 2D:
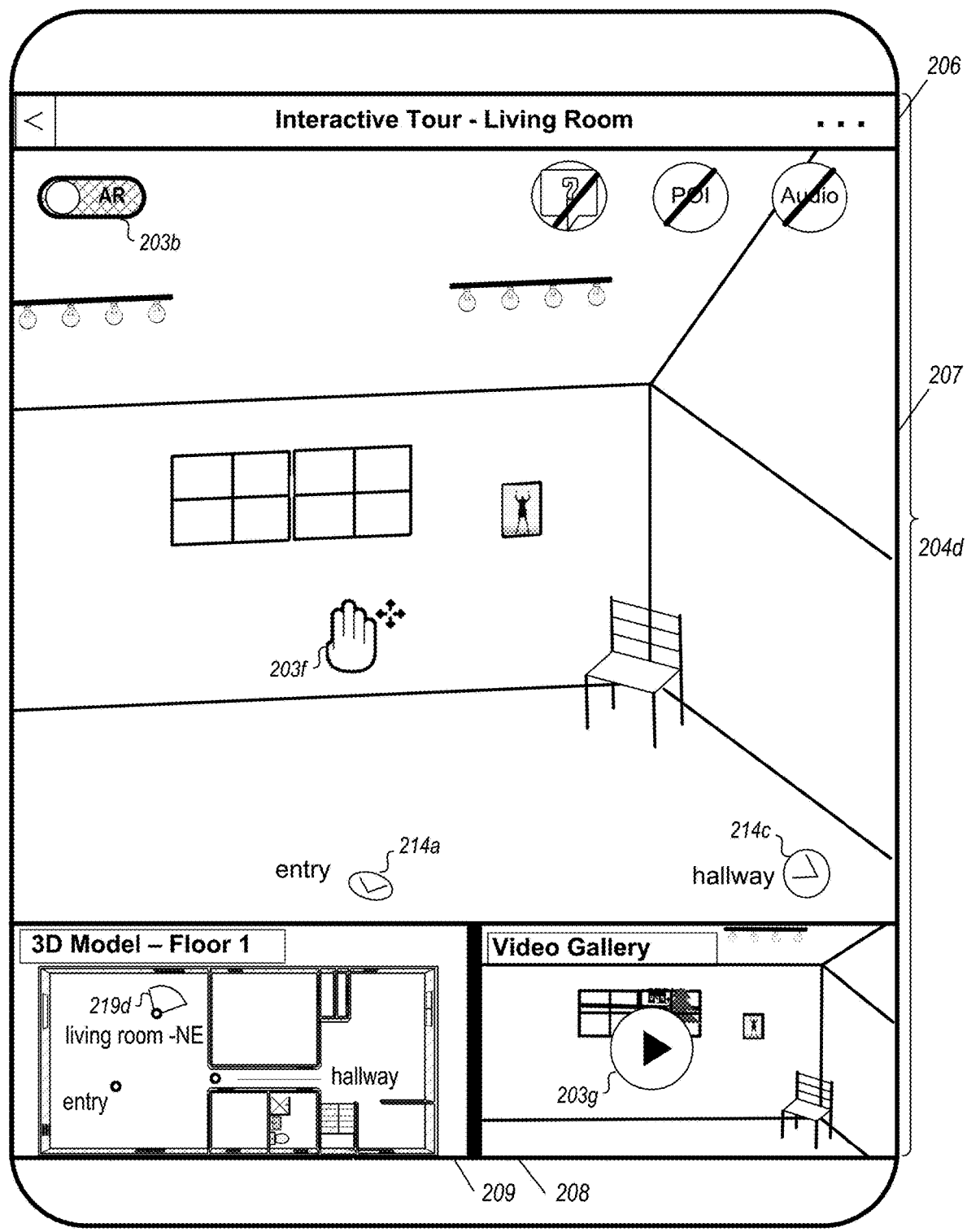

FIG. 2C continues the examples of FIGS. 2A-2B, and illustrates an example of the end user interacting with the GUI displayed in FIG. 2A to initiate a switch of the content between the primary pane 207 and the secondary pane 208, such that the primary pane 207 in the updated information 204c of the updated GUI of FIG. 2C is the interface to the interactive tour of the house, with the visual indicators 214b and 214c in FIG. 2C now being selectable by the user to change the current viewing location, as further illustrated with respect to FIG. 2D. In at least some embodiments and situations, the information displayed in the secondary pane 209 would not change in FIG. 2C (other than updating the visual indicator 219c), such as due to the content of the primary pane continuing to correspond to the same portion of the 3D computer model that was shown in FIGS. 2A and 2B—in this example, however, the information in the secondary pane 209 has been updated for the purposes of illustration to show the entire 3D computer model for the current floor of the house. In addition, contents of the secondary pane 208 have been updated in this example to show the image that was previously present in the primary pane in FIG. 2A. It will be appreciated that the header portion 206 of the primary pane 207 is also updated in FIG. 2C to reflect the new type of content being shown in the primary pane.

FIG. 2D continues the examples of FIGS. 2A-2C, and in this example corresponds to the end user having selected the user-selectable visual indicator 214b in FIG. 2C to change the current viewing location for the interactive tour. In response to that selection, the background image used for the interactive tour interface in the primary pane 207 of FIG. 2D has changed to the updated information 204d shown in the primary pane for the updated GUI, corresponding to an image taken from the viewing location 210B in the northeast part of the living room, and the user-selectable visual indicators in the primary pane have similarly been updated, with the direction of the previous indicator 214c changing to point to the direction of the hallway from the new background image that is shown, and with the previous visual indicator 214b for the northeast living room viewing location 210B (which is now the current viewing location) being changed to the new user-selectable visual indicator 214a for the entry viewing location 210A in the living room (which was the previous viewing location). In addition, a new visual indicator 203f has been added to reflect an alternative manner for the end user to adjust the panorama image shown as the background of the primary pane, such as to manually drag the image up, down, left and/or right to display other parts of the panorama image that are not currently visible in the subset shown in the primary pane, as discussed further in FIG. 2E. As in the previous examples, the visual indicator 219d in the 3D computer model of the secondary pane 209 has been updated to correspond to the location and orientation at which the new background image shown in the primary pane was captured. In addition, while the content previously shown in the secondary pane 208 of FIG. 2C may in some embodiments and situations continue to be shown in the secondary pane 208 in FIG. 2D, in this example the content has been changed for illustrative purposes to provide content of another type that corresponds to the same area of the house, which in this example is a video of at least that portion of the house. In this example, the video in the secondary pane 208 includes a visual indicator 203g of a play button for the video, although the visual indicator may not be user-selectable in at least some embodiments until the video content is moved to the primary pane.

Figure 2E:
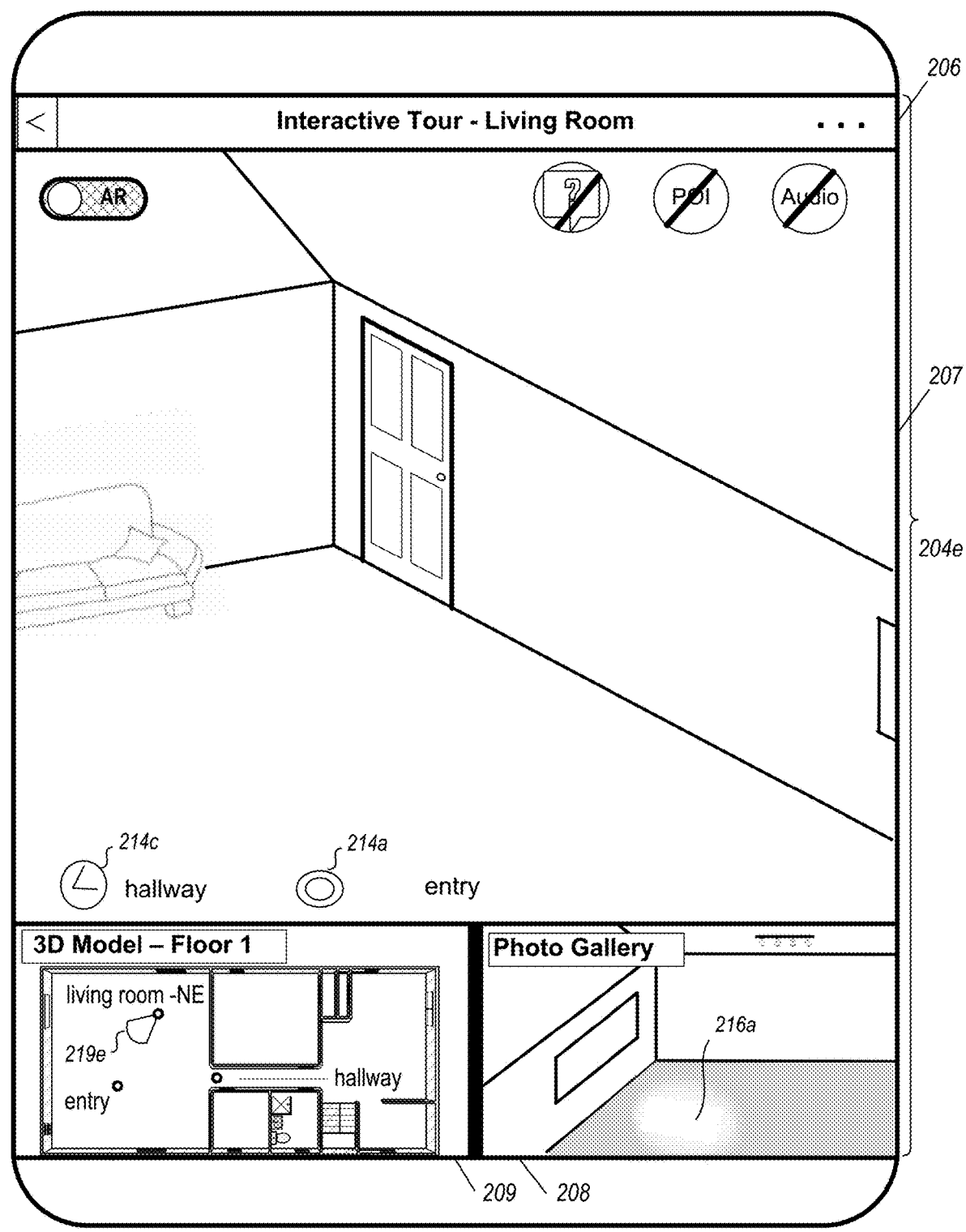

FIG. 2E continues the examples of FIG. 2A-2D, and in this example illustrates the effects of the end user having used the control 203f of FIG. 2D to change the subset of the background panorama image (e.g., a 360° panorama image) that is shown by rotating approximately 180°, so as to now point toward the southwest corner of the living room from the viewing location 210B in the northeast corner of the living room, as shown in the updated information 204e of the updated GUI. In this example, the user-selectable visual indicators 214c and 214a (for viewing locations 210C and 210A, respectively) have been updated to correspond to the positions of those viewing locations relative to the content shown in the background image, and the visual indicator 219e in the 3D computer model of the secondary pane 209 has been similarly updated. While the contents of the secondary pane 208 may be unchanged in this situation, the image in the photo gallery of secondary pane 208 has been changed in this example to an image that is closest to that of the current background image in the primary pane (so as to maintain a coordinated display of information that is integrated with the primary pane), which in this example is of the window of the west wall of the living room. In addition, this example further illustrates that additional types of information may be overlaid on images in at least some situations, such as in this example to overlay simulated lighting information 216a on that image (although a corresponding user-selectable control to initiate that display is not shown in this example). It will be appreciated that additional overlay information, such as that of the simulated lighting, may be controlled by the end user in various manners, including as is discussed in greater detail with respect to FIG. 2F.

Figure 2F:
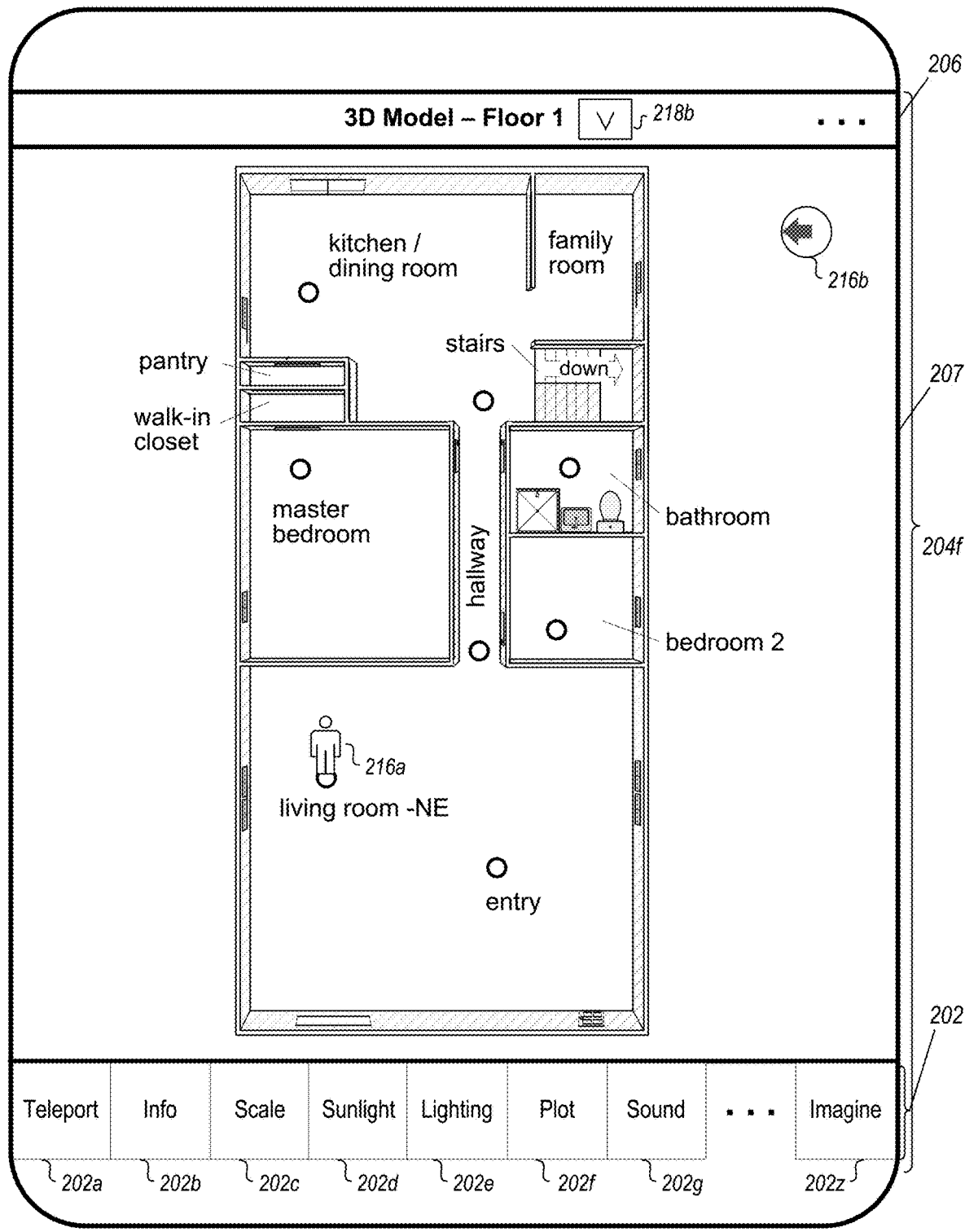

FIG. 2F continues the examples of FIGS. 2A-2E, and illustrates updated information 204*f* in the updated GUI in which the secondary panes 208 and 209 are not shown, but the additional user-selectable controls 202 are included (e.g., based on the primary pane 207 being changed to show the 3D computer model of the house). In this example, the header information 206 is updated to include an additional user-selectable control 218*b* that allows the end user to select which floor of the house is shown, with the house in this example having an additional basement floor accessible via the stairs (as illustrated further with respect to FIG. 2G). In this example, the 3D computer model includes illustrations of the positions of the viewing/capture locations for the interactive tour, with the visual indicator 216*a* being added to correspond to the current viewing location that was last selected. This example further includes a user-selectable control 216*b* that allows an end user to orient the computer model of the house in different manners according to different specified criteria, such as to have a top of the primary pane correspond to magnetic or geographic north, have the top or bottom of the primary pane correspond to the main entry of the house, to provide a best fit of the 3D computer model to the current size and shape of the primary pane, etc. In addition, the user-selectable controls 202 may enable various types of additional information to be overlaid on the floor map or to otherwise invoke additional functionality to be provided, such as one or more of the following: control 202*a* activates a default mode that allows the end user to move to a detailed view of a particular room or viewing location by selecting that room or viewing location on the 3D computer model; control 202*b* shows additional descriptive information of one or more types on the computer model; control 202*c* shows measurements or other scale information on the 3D computer model; control 202*d* shows simulated sunlight on the 3D computer model for specified conditions (e.g., one or more times of day and/or times of year); control 202*e* shows actual interior lighting, optionally under specified conditions; control 202*f* shows information about a surrounding environment of the building (with FIG. 2G providing one example); control 202*g* provides sound recordings from one or more locations of the building (e.g., of ambient sound at specified times); control 202*z* allows virtual objects to be added to the 3D computer model and/or surfaces in the 3D computer model to have virtual changes (e.g., to change color, texture etc. of walls, floors, object surfaces, etc.).

Figure 2G:
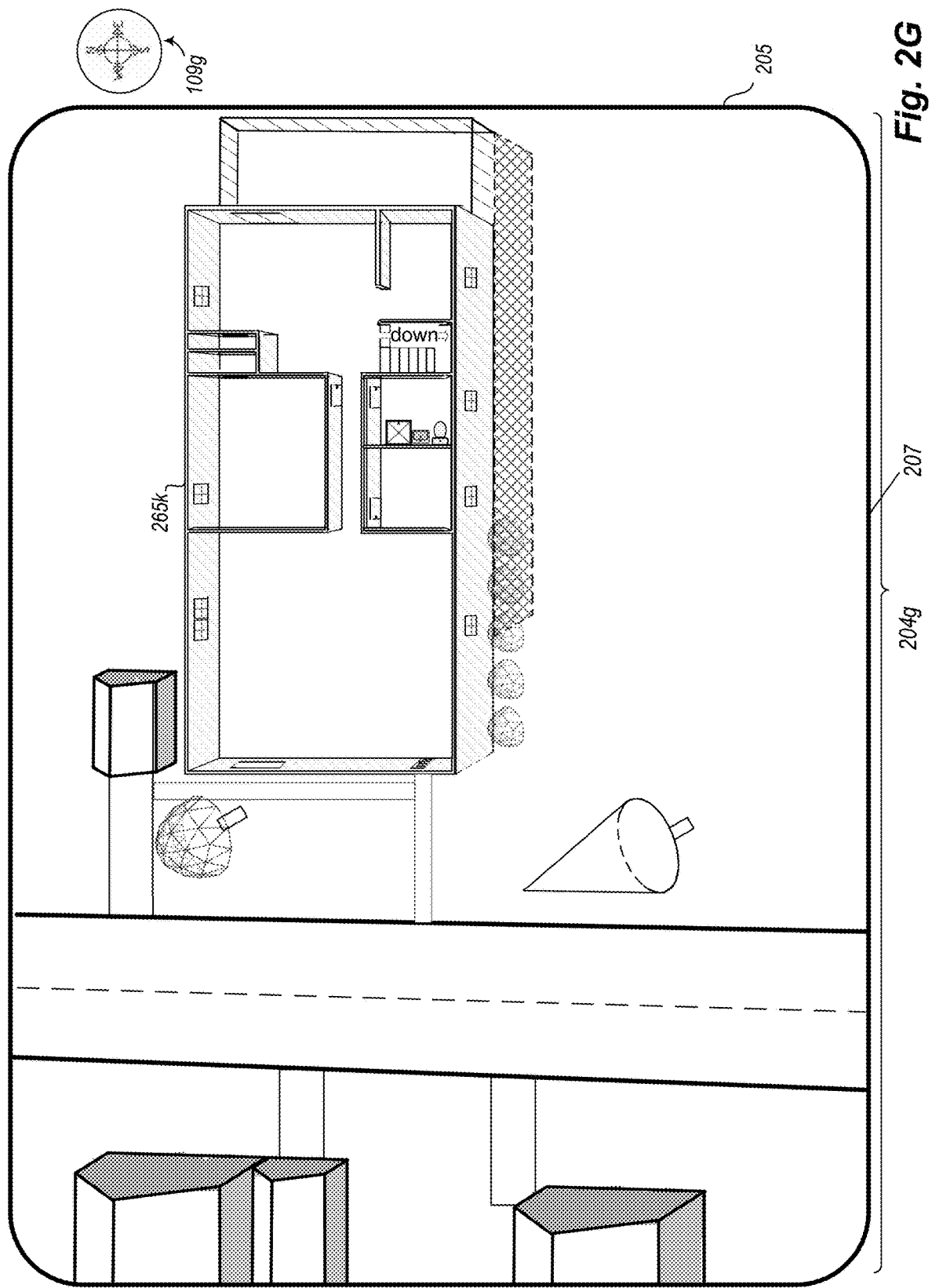

FIG. 2G continues the examples of FIGS. 2A-2F, and illustrates an example of the GUI being updated with information 204*g* to again include only a single primary pane 207, which in this example has no header or separate area for user-selectable controls—in addition, the information being displayed has been adjusted to reflect that the device 205 has been rotated to a landscape orientation. In this example, the end user has selected to display information about the surroundings of the building, which in this example includes a street to the west of the house, with two additional houses across the street being shown, as well as additional information on the house's property that includes two trees, sidewalks, a driveway and garage, and bushes or other shrubs on the south side of the house (as indicated by the visual indicator 109*g*). This example further illustrates a deck to the east of the house, and includes visual information about a basement existing below ground level, although details of the interior of the basement are not shown in this example. The vegetation and surrounding buildings are shown in this example using simplified geometrical shapes, such as to enable the use of such shapes to simulate shading (not shown) if a simulated lighting information option is selected for the display, although actual images of surroundings may instead be used in other embodiments and situations. It will be appreciated that a variety of other types of information may be shown about the surroundings of the building, including images and/or video from ground level and/or an aerial view, as well as additional points of interest in descriptive information about the surrounding neighborhood.

Figure 2H:
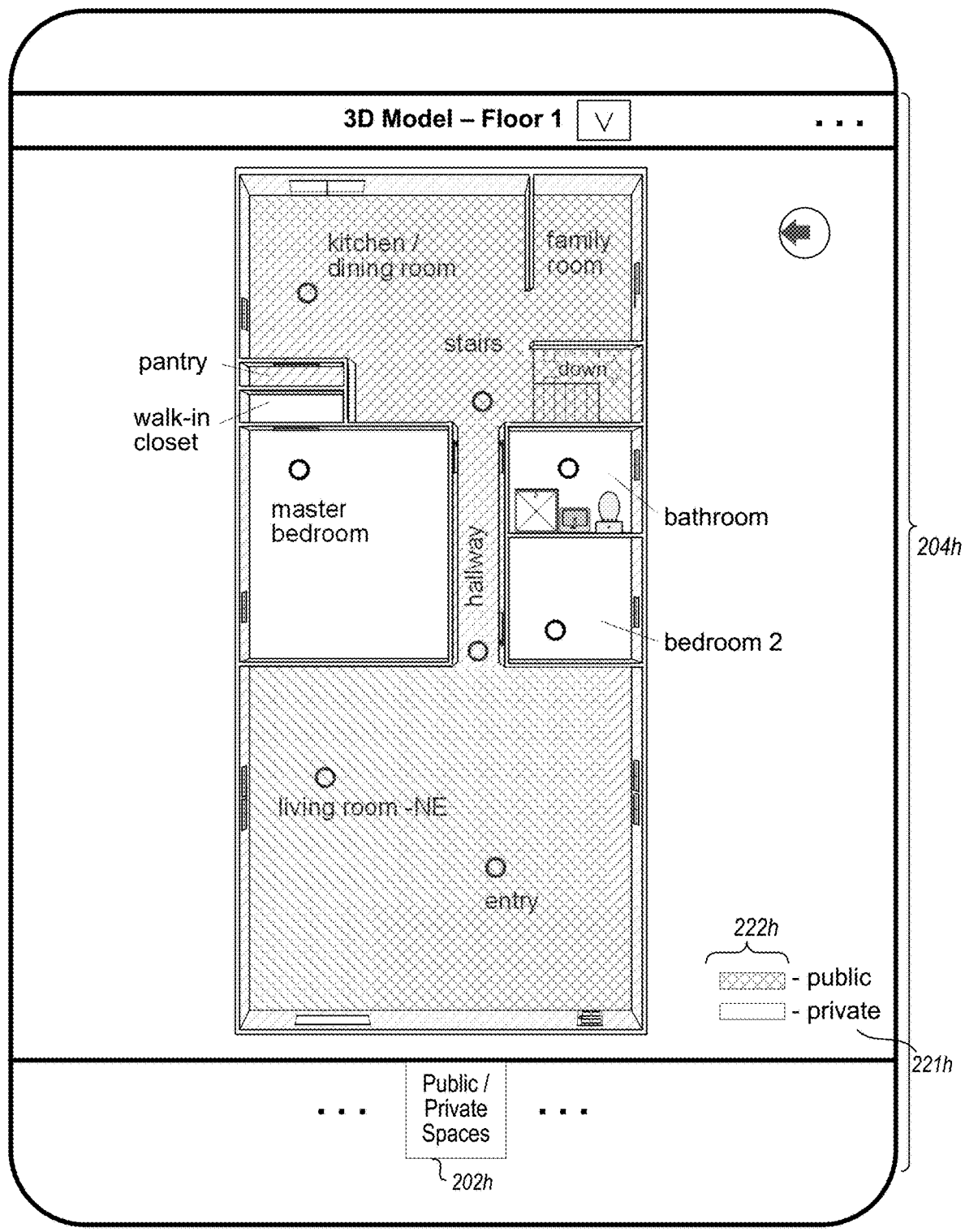

FIG. 2H continues the examples of FIGS. 2A-2G, and illustrates an example of the GUI similar to that of FIG. 2F, but updated with information 204*h* corresponding to selection of control 202*h* by the end user. In this example, the control 202*h* corresponds to updating the displayed floor plan of the house to visually show information about spaces of the house that are public (e.g., living room, kitchen, dining room, hallways, stairs, etc.) and that are private (e.g., bathrooms, bedrooms, etc.), such as displaying one or both types of spaces with specified colors and/or patterns. In this example, a legend 221*h* is displayed to show options 222*h* for patterns to use, with the displayed floor plan having corresponding displayed information (e.g., via a public/private visual layer that is overlaid on the floor plan). The public and private spaces of the house may be determined in various manners in various embodiments, such as automatically (e.g., based on previously determined room types, based on analysis of images) and/or based on user annotations or other input (e.g., from one or more system operator users of the BIIP and/or ICA systems, from end users, etc.).

Figure 2I:
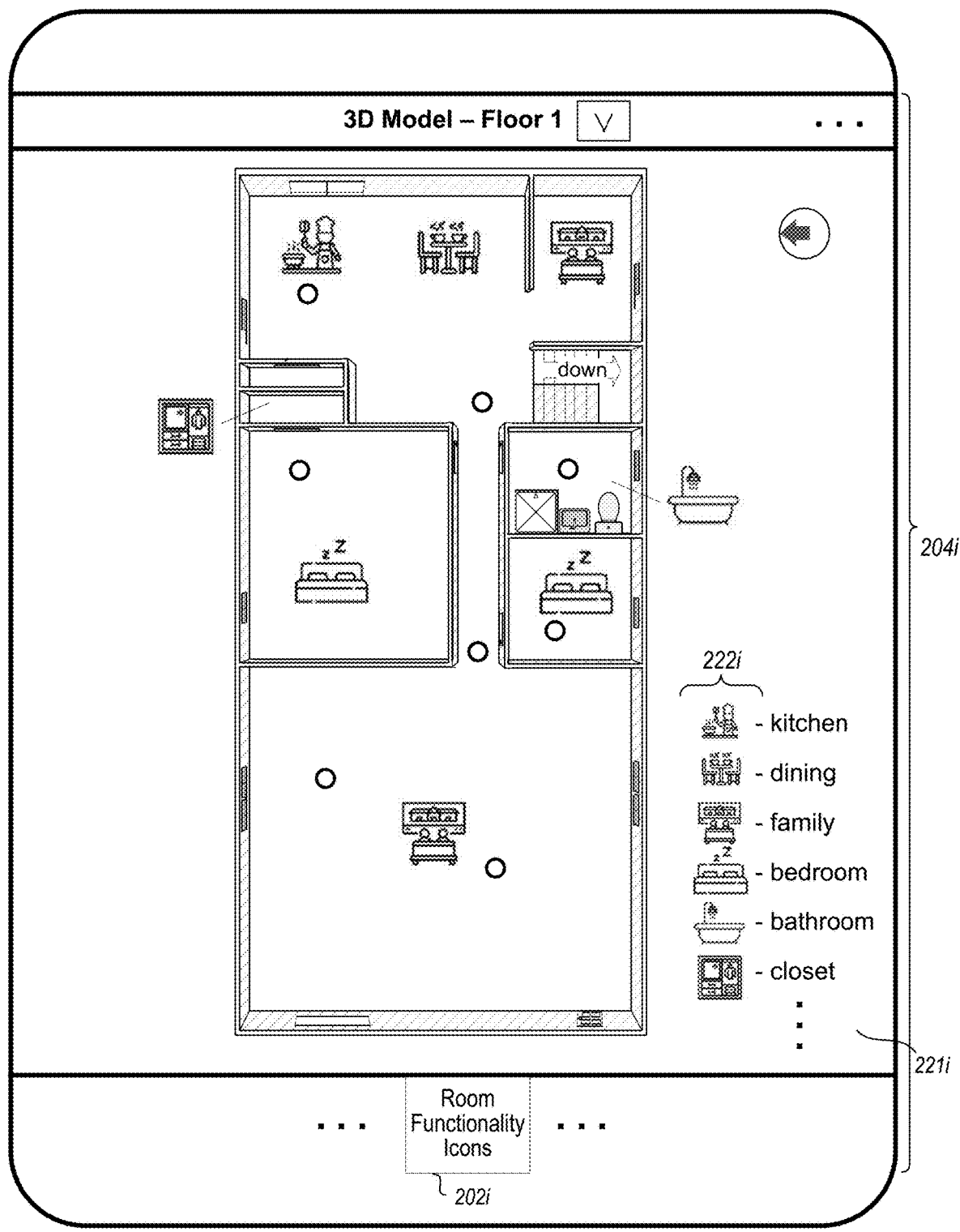

FIG. 2I continues the examples of FIGS. 2A-2H, and illustrates an example of the GUI similar to that of FIG. 2H, but instead being updated with information 204*i* (instead of information 204*h*) corresponding to selection of control 202*i* by the end user. In this example, the control 202*i* corresponds to updating the displayed floor plan of the house to visually show icon information about types of rooms of the house (e.g., instead of the room type textual labels shown in FIG. 2H). In this example, a legend 221*i* is displayed to show icons 222*i* to use for different types of rooms, with the displayed floor plan having corresponding displayed icons (e.g., via a room type icon visual layer that is overlaid on the floor plan, such as instead of or in addition to a room type textual label visual layer). As previously discussed, types of rooms may be determined in various manners in various embodiments, such as automatically (e.g., based on analysis of images and/or use of machine learning techniques) and/or based on user annotations or other input (e.g., from one or more system operator users of the BIIP and/or ICA systems, from end users, etc.).

Figure 2J:
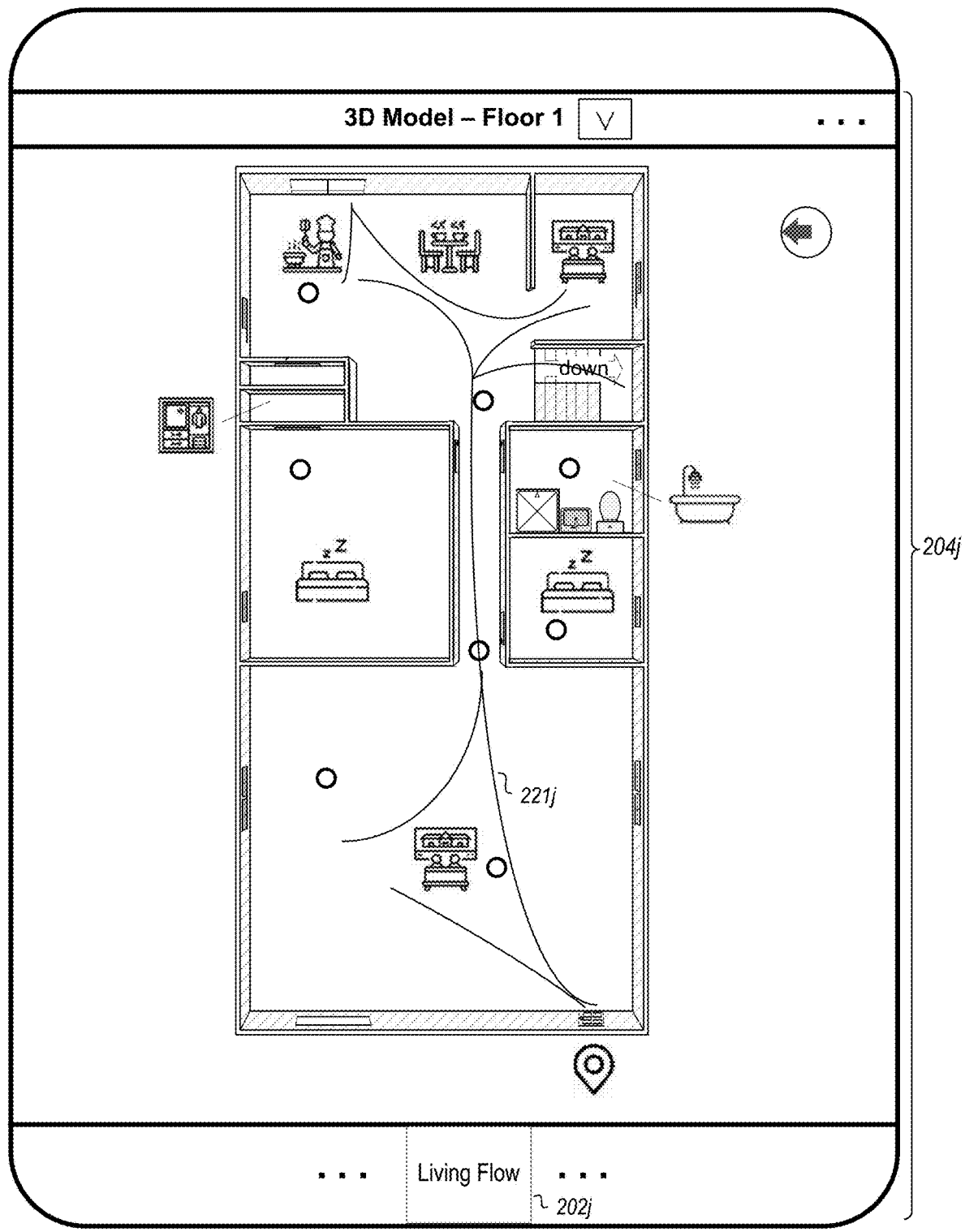

FIG. 2J continues the examples of FIGS. 2A-2I, and illustrates an example of the GUI similar to that of FIG. 2I, but being updated with information 204*j* corresponding to selection of control 202*j* by the end user. In this example, the control 202*j* corresponds to updating the displayed floor plan of the house to visually show examples of inhabitant flow pattern information 221*j* corresponding to typical or common movement patterns of people (e.g., in addition to room type icons, while in other embodiments may be shown without room type label or icon information). In this example, the flow pattern information may be displayed, for example, via a flow pattern visual layer that is overlaid on the floor plan, such as instead of or in addition to one or more other visual layers. Such flow pattern information may be determined in various manners in various embodiments, such as automatically (e.g., based on analysis of video taken over time within the house interior, based on other tracking of user movements within the house interior, based on analysis of images to determine open lanes or spaces for user movement, etc.) and/or based on user annotations or other input (e.g., from one or more system operator users of the BIIP and/or ICA systems, from end users, etc.).

Figure 2K:
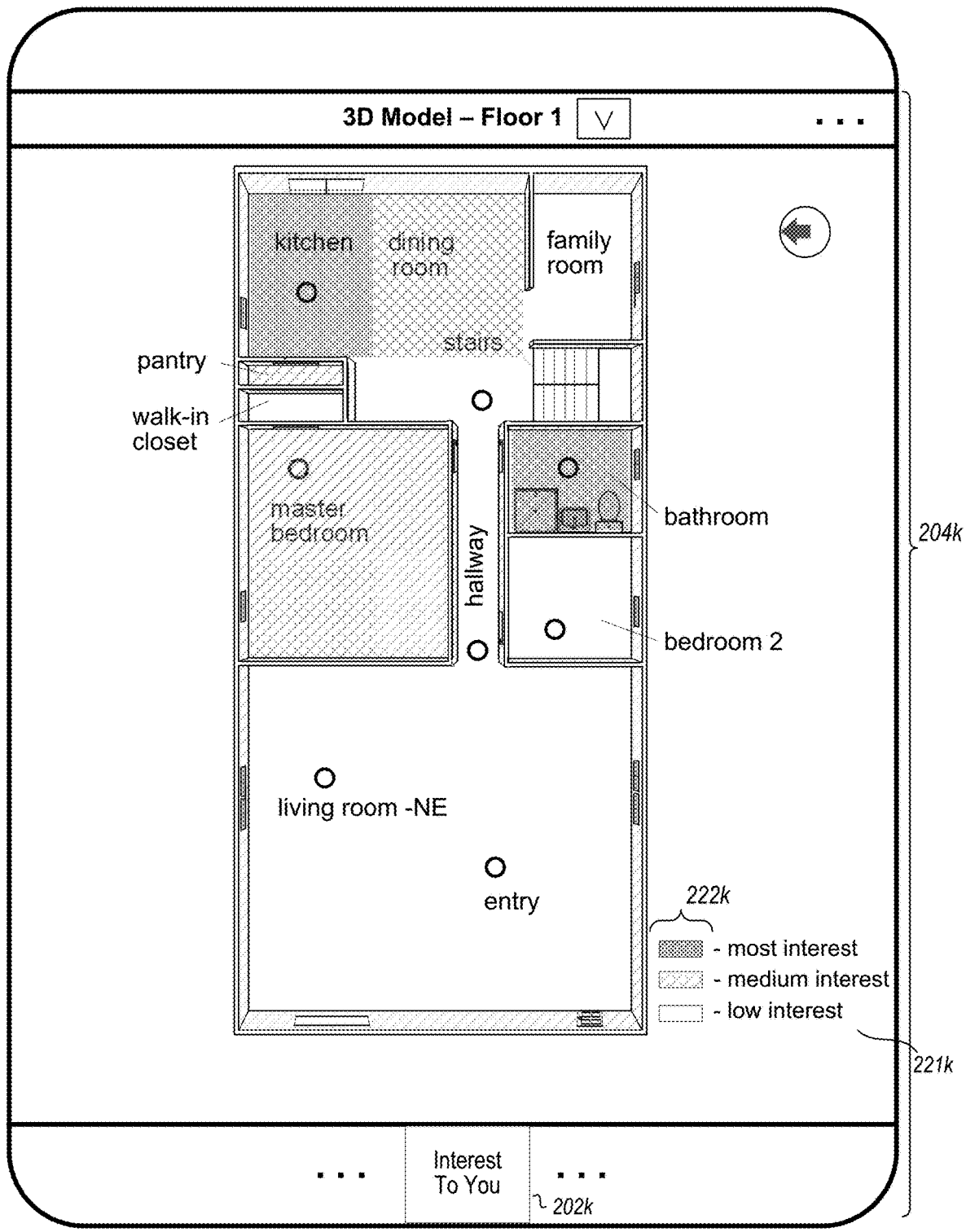

FIG. 2K continues the examples of FIGS. 2A-2J, and illustrates an example of the GUI similar to that of FIG. 2H, but updated with information 204k corresponding to selection of control 202k by the end user. In this example, the control 202k corresponds to updating the displayed floor plan of the house to visually show information about spaces of the house that are likely to be of most interest to the end user, such as displaying spaces corresponding to different levels of likely user interest with different specified colors and/or patterns. In this example, a legend 221k is displayed to show patterns 222k for patterns to use, with the displayed floor plan having corresponding displayed information (e.g., via a user-specific personalized visual layer that is overlaid on the floor plan). The areas of the house that are likely to be of interest to the end user may be determined in various manners in various embodiments, such as automatically (e.g., based on tracking a quantity of time and/or a length of time that the end user has previously spent viewing different parts of this house, based on an analysis of corresponding types of information for the end user from multiple other houses, etc.) and/or based on user annotations or other input (e.g., from previously specified preferences of the end user; from previous indications of the end user of particular parts of the house that are of interest, such as by flagging or pinning particular rooms and/or images; etc.).

Figure 2L:
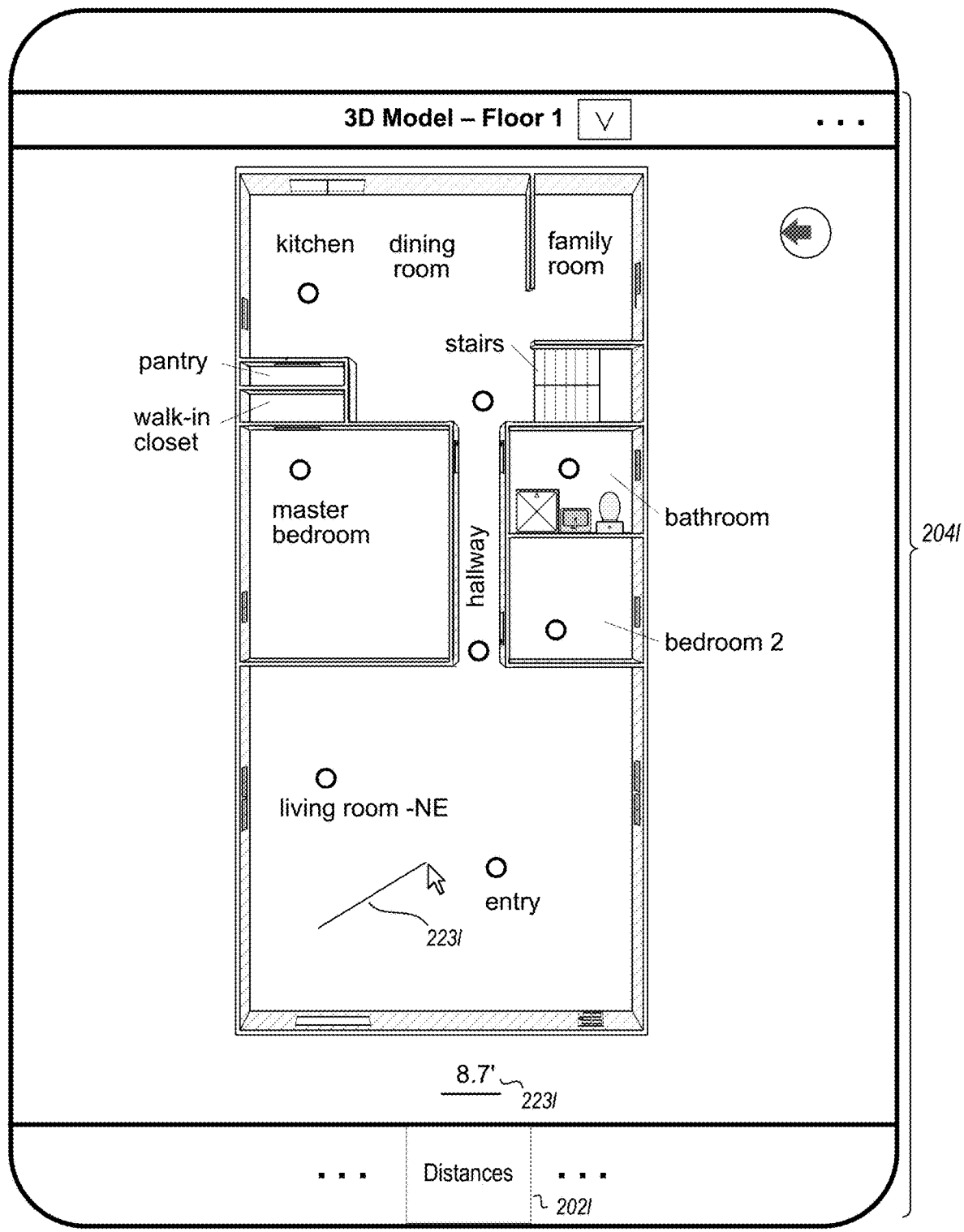

FIG. 2L continues the examples of FIGS. 2A-2K, and illustrates an example of the GUI similar to that of FIG. 2F, but updated with information 204l corresponding to selection of control 202l by the end user. In this example, the control 202l corresponds to providing interactive functionality for the end user to specify a length on the displayed floor plan of the house (e.g., by dragging a line 223l, by selecting two end points, etc.) and receive information about the distance of that length (e.g., displayed distance information 224l). The distance may be automatically determined in various manners in various embodiments, such as based on previous and/or concurrent analysis of images of the house interior to determine sizes of known or unknown objects, as discussed in greater detail elsewhere herein. In addition, while the distance functionality is provided using a 3D floor plan in this example, similar functionality may be provided on other media or types of information in other embodiments, such as on displayed panorama or perspective images, during interactive virtual tours of inter-linked viewing locations, etc.

Various details have been provided with respect to FIGS. 2A-2L, but it will be appreciated that the provided details are non-exclusive examples included for illustrative purposes, and other embodiments may be performed in other manners without some or all such details. For example, while not illustrated in the examples of FIGS. 2A-2L, the GUI could have other forms in other embodiments, such as to have other user-selectable and/or user-modifiable controls (whether instead of or in addition to the illustrated controls), and/or to have particular controls be accessed and used in other manners, and/or to be displayed or otherwise presented on other types of devices (e.g., desktop or laptop computers, tablet computers, etc.), and/or to be displayed or otherwise presented in other types of formats and layouts (e.g., to have more or less GUI panes, to have different layouts and/or sizes of GUI panes, to display multiple types of information simultaneously without using GUI panes like those of the examples, etc.). In addition, additional types of functionality related to displaying or otherwise presenting building interior information may be provided in other embodiments. Various other changes to the GUI may be further made in other embodiments.

Figure 3:
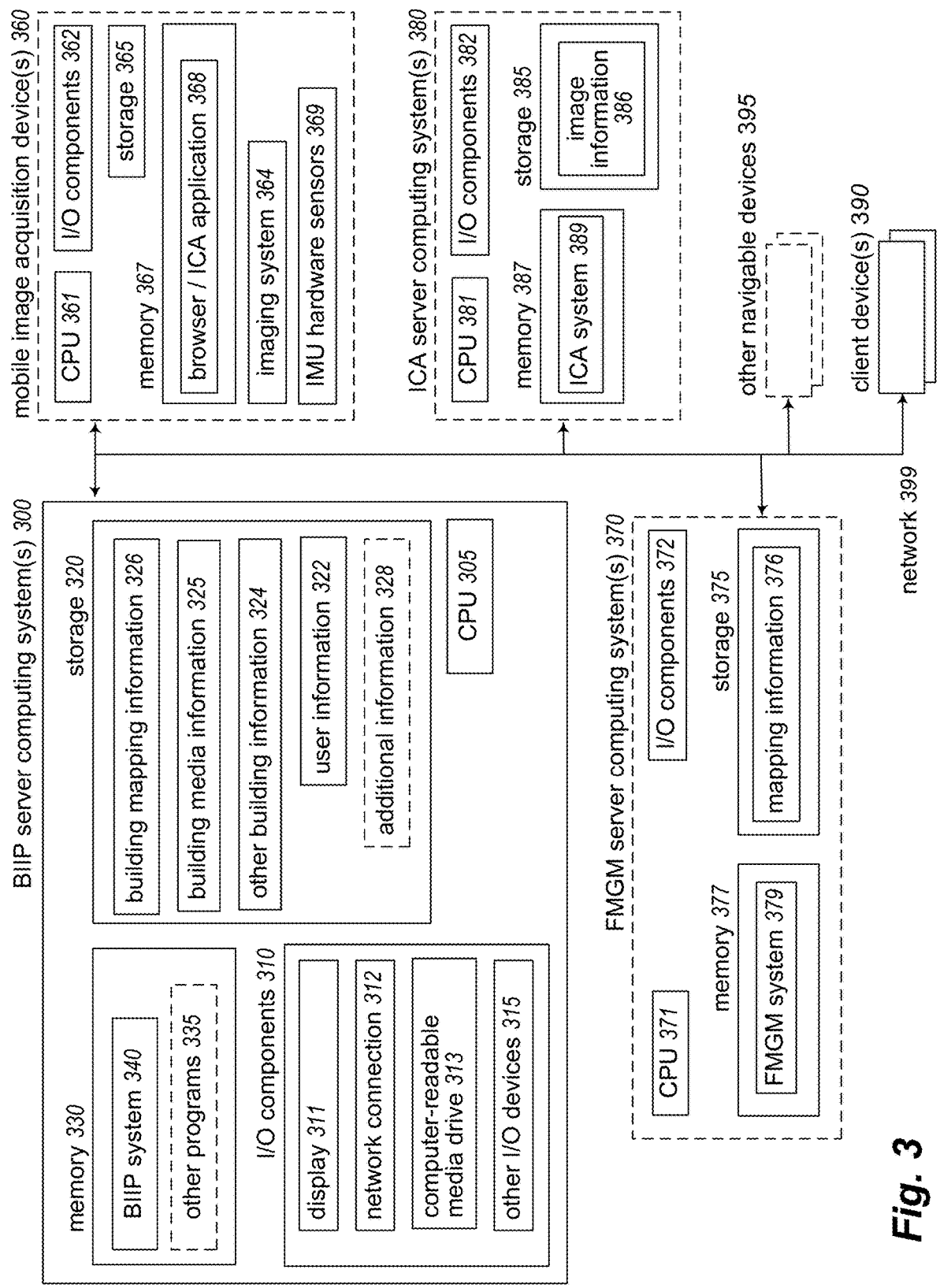
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of a BIIP system 340, optionally one or more server computing systems 380 executing an implementation of an ICA system 389, and optionally one or more server computing systems 370 executing an implementation of an FMGM system 379—the server computing system(s) and BIIP and/or FMGM and/or ICA systems may be implemented using a plurality of hardware components that form electronic circuits suitable for and configured to, when in combined operation, perform at least some of the techniques described herein. In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 and 370 may have similar components, although only one or more hardware processors 381 and 371, memory 387 and 377, storage 385 and 375, and I/O components 382 and 372, respectively, are illustrated for the sake of brevity.

The server computing system(s) 300 and executing BIIP system 340, and server computing system(s) 380 and executing ICA system 389 if present, and server computing system(s) 370 and executing FMGM system 379 if present, may communicate with each other and with other computing systems and devices in this illustrated embodiment via one or more networks 399 (e.g., the Internet, one or more cellular telephone networks, etc.), such as to interact with user client computing devices 390 (e.g., used to view a GUI that simultaneously displays multiple types of information about an interior of a building in an integrated and coordinated manner, or to otherwise present information about a building), and/or one or more mobile image acquisition devices 360 (e.g., used to acquire images and optionally other information for buildings or other environments to be modeled), and/or optionally other navigable devices 395 that receive and use computer models and/or other building information (e.g., 2D floor maps) for navigation purposes (e.g., for use by semi-autonomous or fully autonomous vehicles or other devices). In other embodiments, some of the described functionality may be combined in less computing systems, such as to combine the ICA system 389 and the image acquisition functionality of device(s) 360 in a single system or device (e.g. via the optional ICA application 368 executing in memory 367 of the mobile device 360), to combine the BIIP system 340 and/or the ICA system 389 and/or the FMGM system 379 in a single system or device, to combine the BIIP system 340 and the ICA system 389 and the FMGM system 379 and the image acquisition functionality of device(s) 360 in a single system or device, etc.

In the illustrated example of FIG. 3, an embodiment of the BIIP system 340 executes in memory 330 of the server computing system(s) 300 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the BIIP system may include one or more components, not shown, to each perform portions of the functionality of the BIIP system, and the memory may further optionally execute one or more other programs 335—as one specific example, a copy of the ICA and/or FMGM systems may each execute as one of the other programs 335 in at least some embodiments, such as instead of or in addition to the ICA system 389 on the server computing system(s) 380 and the FMGM system 379 on the server computing system(s) 370. The BIIP system 340 may further, during its operation, store and/or retrieve various types of data on storage 320 (e.g., in one or more databases or other data structures), such as various types of user information 322, images and other media information 325 acquired from or about a building (e.g., received from ICA system 389, to provide to users of client computing devices 390 for display; etc.), generated computer models and optionally floor maps and other associated mapping information 326 (e.g., received from FMGM system 379, such as generated and saved 2.5D and/or 3D models, 2D floor maps, etc.), other types of building information 324 (e.g., annotations and other descriptions, information about points of interest, information about surrounding buildings and/or vegetation and/or other exterior information for the building, etc.; as well as information from end users, such as questions; information from BIIP system operator users or other authorized users, such as answers to questions; etc.), and/or various types of optional additional information 328 (e.g., various analytical information related to analysis of other building information and/or end user activities).

In addition, an embodiment of the ICA system 389 executes in memory 387 of the server computing system(s) 380 in the illustrated embodiment in order to perform automated operations related to acquiring images of building interiors (and optionally exteriors of buildings, including their surroundings), such as by using the processor(s) 381 to execute software instructions of the system 389 in a manner that configures the processor(s) 381 and computing system 380 to perform such automated operations. Similarly, an embodiment of the FMGM system 379 executes in memory 377 of the server computing system(s) 370 in the illustrated embodiment in order to perform automated operations related to generating computer models and optionally floor maps of building interiors, such as by using the processor(s) 371 to execute software instructions of the system 379 in a manner that configures the processor(s) 371 and computing system 370 to perform such automated operations. The illustrated embodiments of the ICA and/or FMGM systems may each include one or more components, not shown, to each perform portions of the functionality of their respective ICA or FMGM system, and the respective computer memories may further optionally execute one or more other programs (not shown). The ICA system 389 and/or FMGM system 379 may further, during their operation, store and/or retrieve various types of data on storage 385 or 375, respectively (e.g., in one or more databases or other data structures), such as acquired images 386, generated computer models 376 (e.g., generated and saved 2.5D and/or 3D models) and optionally floor maps and other associated information 376 (e.g., building and room dimensions for use with associated floor plans, additional images and/or annotation information, various analytical information related to presentation or other use of one or more building interiors or other environments, etc.)—while not illustrated in FIG. 3, the ICA and/or FMGM systems may further store and use additional types of information, such as about system operator users of the respective systems, metadata about acquisition of images to be analyzed, etc.

Some or all of the user client computing devices 390 (e.g., mobile devices), mobile image acquisition devices 360, optional other navigable devices 395 and other computing systems (not shown) may similarly include some or all of the same types of components illustrated for server computing system 300. As one non-limiting example, the mobile image acquisition device(s) 360 are each shown to include one or more hardware CPU(s) 361, I/O components 362, storage 365, and memory 367, with one or both of a browser and one or more client applications 368 (e.g., an application specific to the FMGM system and/or ICA system and/or BIIP system) executing within memory 367, such as to participate in communication with the BIIP system 340, ICA system 389, FMGM system 379 and/or other computing systems—the devices 360 each further include one or more imaging systems 364 and IMU hardware sensors 369, such as for use in acquisition of images and associated movement/travel data of the device 360. While particular components are not illustrated for the other navigable devices 395 or other computing systems 390, it will be appreciated that they may include similar and/or additional components.

It will also be appreciated that computing systems 300, 370 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated systems 340 and/or 379 and/or 389 may in some embodiments each be distributed in various components, some of the described functionality of the systems 340 and/or 379 and/or 389 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BIIP system software 340 executing on server computing systems 300 and/or on devices 360, by the ICA system software 389 executing on server computing systems 380, by the FMGM system software 379 executing on server computing systems 370, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 illustrates an example flow diagram of an embodiment of an ICA System routine 400. The routine may be performed by, for example, the ICA system 160 of FIG. 1A, the ICA system 389 of FIG. 3, and/or the ICA system described with respect to FIGS. 1B-2L and as otherwise described herein, such as to acquire images (e.g., 360° spherical panorama images) at viewing locations within buildings or other structures, such as for use in subsequent generation of related floor maps and/or other mapping information. While portions of the example routine 400 are discussed with respect to acquiring particular types of images at particular viewing locations, it will be appreciated that this or a similar routine may be used to acquire video or other data (e.g., audio), whether instead of or in addition to such images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication from a user of a mobile image acquisition device to begin the image acquisition process at a first viewing location. After block 412, the routine proceeds to block 415 in order to perform viewing location image acquisition activities in order to acquire an image (e.g., a 360° panorama image) for the viewing location in the interior of the target building of interest, optionally via one or more fisheye lenses on the mobile device to provide horizontal coverage of at least 360° around a vertical axis. As one non-exclusive example, the mobile image acquisition device may be a rotating (scanning) panorama camera equipped with a fisheye lens, such as a 180° fisheye giving a full sphere at 360° rotation. The routine may also optionally obtain annotation and/or other information (e.g., information about points of interest, other descriptions, etc.) from the user regarding the viewing location and/or the surrounding environment, such as for later use in presentation of information regarding that viewing location and/or surrounding environment.

After block 415 is completed, the routine continues to block 420 to determine if there are more viewing locations at which to acquire images, such as based on corresponding information provided by the user of the mobile device, and/or based on automated tracking of viewing locations visited (e.g., based on a predefined group of viewing locations, based on acquiring at least one viewing location in each of a predefined group of rooms, etc.). If so, and when the user is ready to continue the process (if the device is carried by the user or its movement is otherwise controlled by the user), the routine continues to block 422 to optionally initiate the capture of linking information (e.g., acceleration data and/or other data that changes as the device moves) during movement of the mobile device along a travel path away from the current viewing location and towards a next viewing location within the building interior. As described elsewhere herein, the captured linking information may include additional sensor data (e.g., from one or more IMUs, or inertial measurement units, on the mobile device or otherwise carried by the user), as well as additional video information, recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next viewing location, and provide one or more guidance cues to the user regarding the motion of the mobile device, quality of the sensor data and/or video information being captured, associated lighting/environmental conditions, advisability of capturing a next viewing location, information about how to reach a defined next viewing location and/or about when the defined next viewing location is reached, and any other suitable aspects of capturing the linking information. Similarly, the routine may optionally obtain annotation and/or other information (e.g., information about points of interest, other descriptions, etc.) from the user regarding the travel path, such as for later use in presentation of information regarding that travel path or a resulting inter-panorama connection link. In block 424, the routine determines that the mobile device has arrived at the next viewing location (e.g., based on an indication from the user, based on the forward movement of the user stopping for at least a predefined amount of time, based on reaching a predefined spot for the next viewing location, etc.), for use as the new current viewing location, and returns to block 415 in order to perform the viewing location image acquisition activities for the new current viewing location.

Figure 5A:
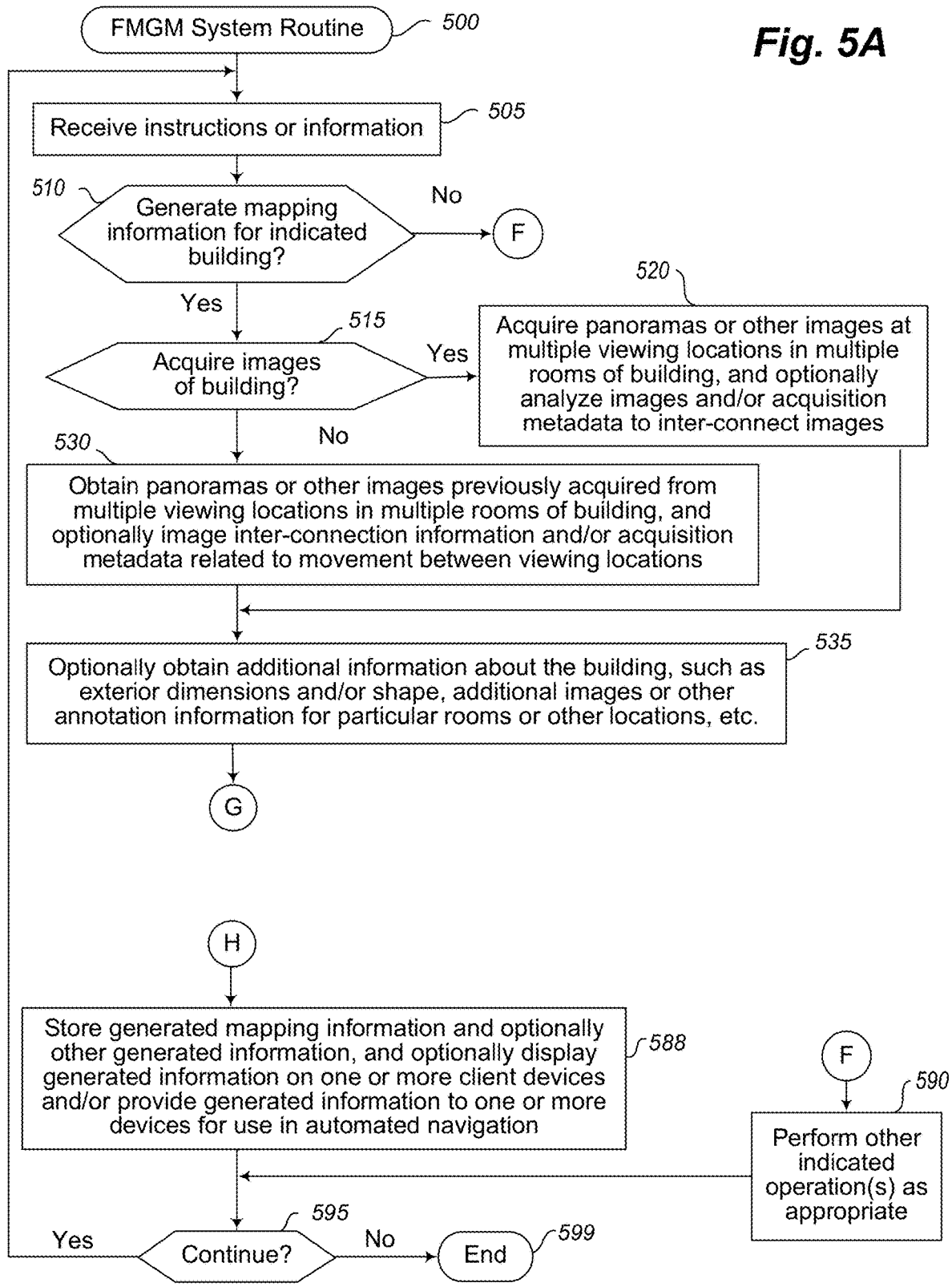
FIGS. 5A-5B illustrate an example embodiment of a flow diagram for a Floor Map Generation Manager (FMGM) system routine in accordance with an embodiment of the present disclosure.
Figure 5B:
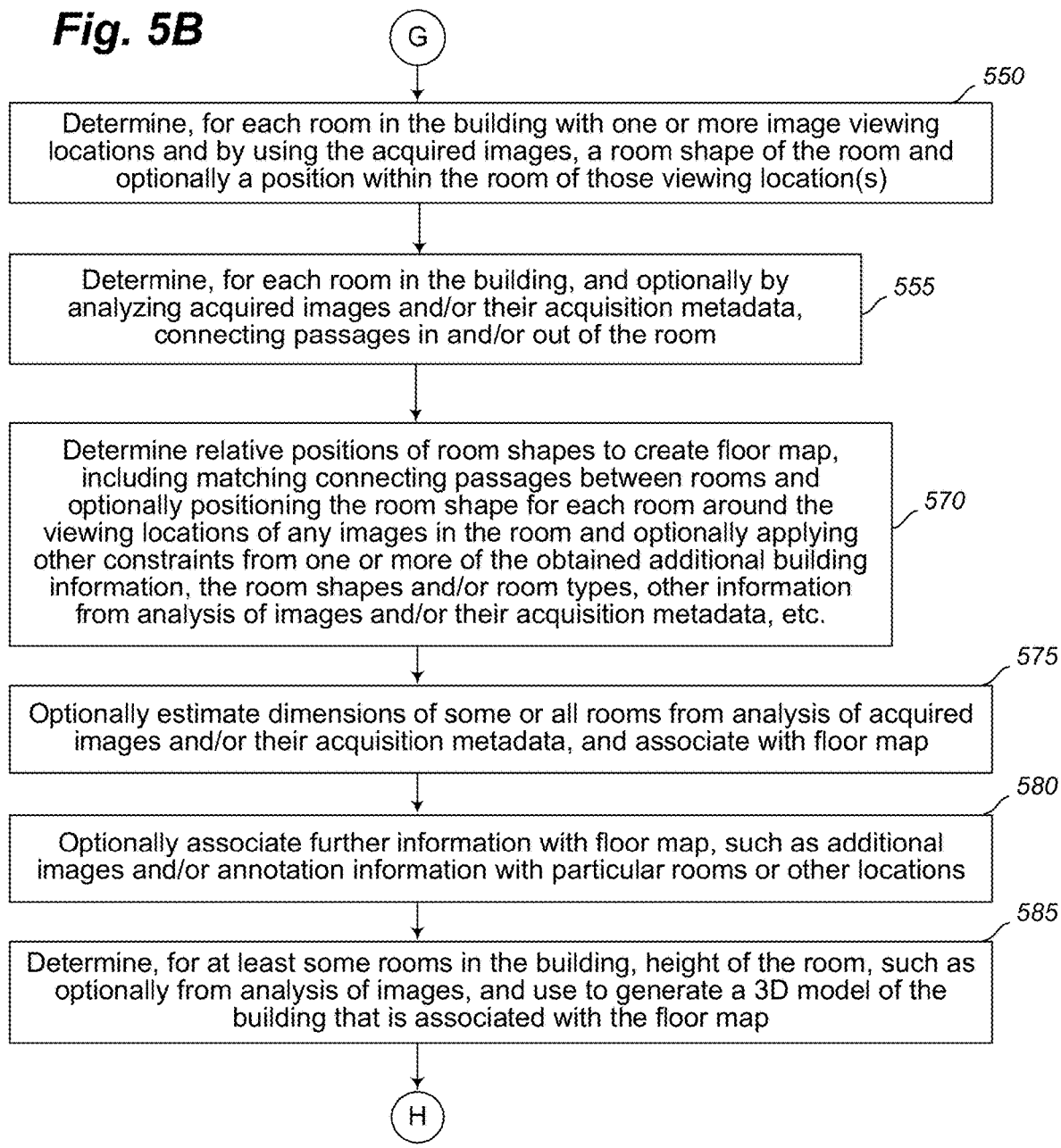

If it is instead determined in block 420 that there are not any more viewing locations at which to acquire image information for the current building or other structure, the routine proceeds to block 425 to optionally analyze the viewing location information for the building or other structure, such as to identify possible additional coverage (and/or other information) to acquire within the building interior. For example, the ICA system may provide one or more notifications to the user regarding the information acquired during capture of the multiple viewing locations and optionally corresponding linking information, such as if it determines that one or more segments of the recorded information are of insufficient or undesirable quality, or do not appear to provide complete coverage of the building. After block 425, the routine continues to block 435 to optionally preprocess the acquired images before their subsequent use for generating related mapping information, such as to perform an equirectangular projection for each such image so that straight vertical data (e.g., the sides of a typical rectangular door frame, a typical border between 2 adjacent walls, etc.) remains straight and in which straight horizontal data (e.g., the top of a typical rectangular door frame, border between a wall and a floor, etc.) at a horizontal midline of the image remains straight but is increasingly curved in the equirectangular projection image in a convex manner relative to the horizontal midline as the distance increases in the image from the horizontal midline. In at least some embodiments, an automated analysis of some or all of the images may further be performed to determine corresponding information about the building interior, such as types of rooms, points of interest in particular locations, etc. In block 477, the images and any associated generated or obtained information is stored for later use, and optionally provided to an FMGM routine for further analysis. FIGS. 5A-5B illustrate one example of a routine for generating a floor map representation of a building interior from the generated panorama information.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ICA system, etc.), to obtain and store other information about users of the system, to respond to requests for generated and stored information, etc.

Following blocks 477 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

FIGS. 5A-5B illustrate an example embodiment of a flow diagram for a Floor Map Generation Manager (FMGM) System routine 500. The routine may be performed by, for example, execution of the FMGM system 160 of FIG. 1A, the FMGM system 379 of FIG. 3, and/or an FMGM system as discussed with respect to FIGS. 1B-2L and elsewhere as described herein, such as to generate a computer model and optionally other mapping information for a defined area based at least in part on images of the area. In the example of FIGS. 5A-5B, the generated mapping information includes a 3D computer model and 2D floor map of a building, such as a house, but in other embodiments, other types of mapping information may be determined and generated for other types of buildings and used in other manners, as discussed elsewhere herein.

The illustrated embodiment of the routine begins at block 505, where information or instructions are received. The routine continues to block 510 to determine whether the instructions received in block 505 indicate to generate mapping information for an indicated building, optionally along with associated information about the building, and if so the routine continues to perform blocks 515-588 to do so, and otherwise continues to block 590.

In block 515, the routine determines whether image information is already available for the building, or if such information instead needs to be acquired. If it is determined in block 515 that the information needs to be acquired, the routine continues to block 520 to acquire such information, optionally waiting for one or more users or devices to move throughout the building and acquire panoramas or other images at multiple viewing locations in multiple rooms of the building, and to optionally further analyze the images and/or metadata information about their acquisition to interconnect the images, as discussed in greater detail elsewhere herein—FIG. 4 provides one example embodiment of an ICA system routine for performing such image acquisition. If it is instead determined in block 515 that it is not necessary to acquire the images, the routine continues instead to block 530 to obtain existing panoramas or other images from multiple viewing locations in multiple rooms of the building, optionally along with interconnection information for the images and acquisition of metadata information related to movement between the viewing locations, such as may in some situations have been supplied in block 505 along with the corresponding instructions.

After blocks 520 or 530, the routine continues to block 535 to optionally obtain additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations within the building (optionally for locations different from viewing locations of the acquired panorama or other images), etc.

After block 535, the routine continues to block 550 to determine, for each room inside the building with one or more viewing locations and associated acquired images, a room shape of the room for data in the image(s) taken inside the room, and optionally a position within the room of its viewing location(s), such as in an automated manner. In block 555, the routine further uses visual data in the images and/or the acquisition metadata for them to determine, for each room in the building, any connecting passages in or out of the room, such as in an automated manner. It will be appreciated that, while blocks 550-555, are illustrated as separate operations in this example, in some embodiments a single analysis of the images may be performed to acquire or determine multiple types of information, such as those discussed with respect to blocks 550-555.

In block 570, the routine then determines estimated positions of the room shapes to create an initial 2D floor map, such as by connecting inter-room passages in their respective rooms, by optionally positioning room shapes around determined viewing location positions (e.g., if the viewing location positions are inter-connected), and by optionally applying one or more constraints or optimizations. Such a floor map may include, for example, relative position and shape information for the various rooms without providing any actual dimension information for the individual rooms or building as a whole, and may further include multiple linked or associated sub-maps (e.g., to reflect different stories, levels, sections, etc.) of the building.

After block 570, the routine optionally performs one or more steps 575-580 to determine and associate additional information with the floor map. In block 575, the routine optionally estimates the dimensions of some or all of the rooms, such as from analysis of images and/or their acquisition metadata or from overall dimension information obtained for the exterior of the building, and associates the estimated dimensions with the floor map—it will be appreciated that if sufficiently detailed dimension information were available, a floor plan (e.g., architectural drawings, blue prints, etc.) may be generated from the floor map. After block 575, the routine continues to block 580 to optionally associate further information with the floor map (e.g., with particular rooms or other locations within the building), such as additional images and/or annotation information. In block 585, the routine further estimates heights of walls in some or all rooms, such as from analysis of images and optionally sizes of known objects in the images, as well as height information about a camera when the images were acquired, and further uses such information to generate a 3D computer model of the building, with the 3D model and the floor map being associated with each other.

After block 585, the routine continues to block 588 to store the generated mapping information and optionally other generated information, and to optionally further use the generated mapping information, such as to provide the generated 3D computer model and/or 2D floor map for display on one or more client devices, provide that generated information to one or more other devices for use in automating navigation of those devices and/or associated vehicles or other entities, etc.

If it is instead determined in block 510 that the information or instructions received in block 505 are not to generate mapping information for an indicated building, the routine continues instead to block 590 to perform one or more other indicated operations as appropriate. Such other operations may include, for example, receiving and responding to requests for previously generated computer models and/or floor maps and/or other generated information (e.g., requests for such information for use by a BIIP system in generating and presenting a GUI that simultaneously displays multiple types of information about a building in an integrated and coordinated manner, requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 588 or 590, the routine continues to block 595 to determine whether to continue, such as until an explicit indication to terminate is received. If it is determined to continue, the routine returns to block 505 to wait for and receive additional instructions or information, and otherwise continues to block 599 and ends.

Figure 6:
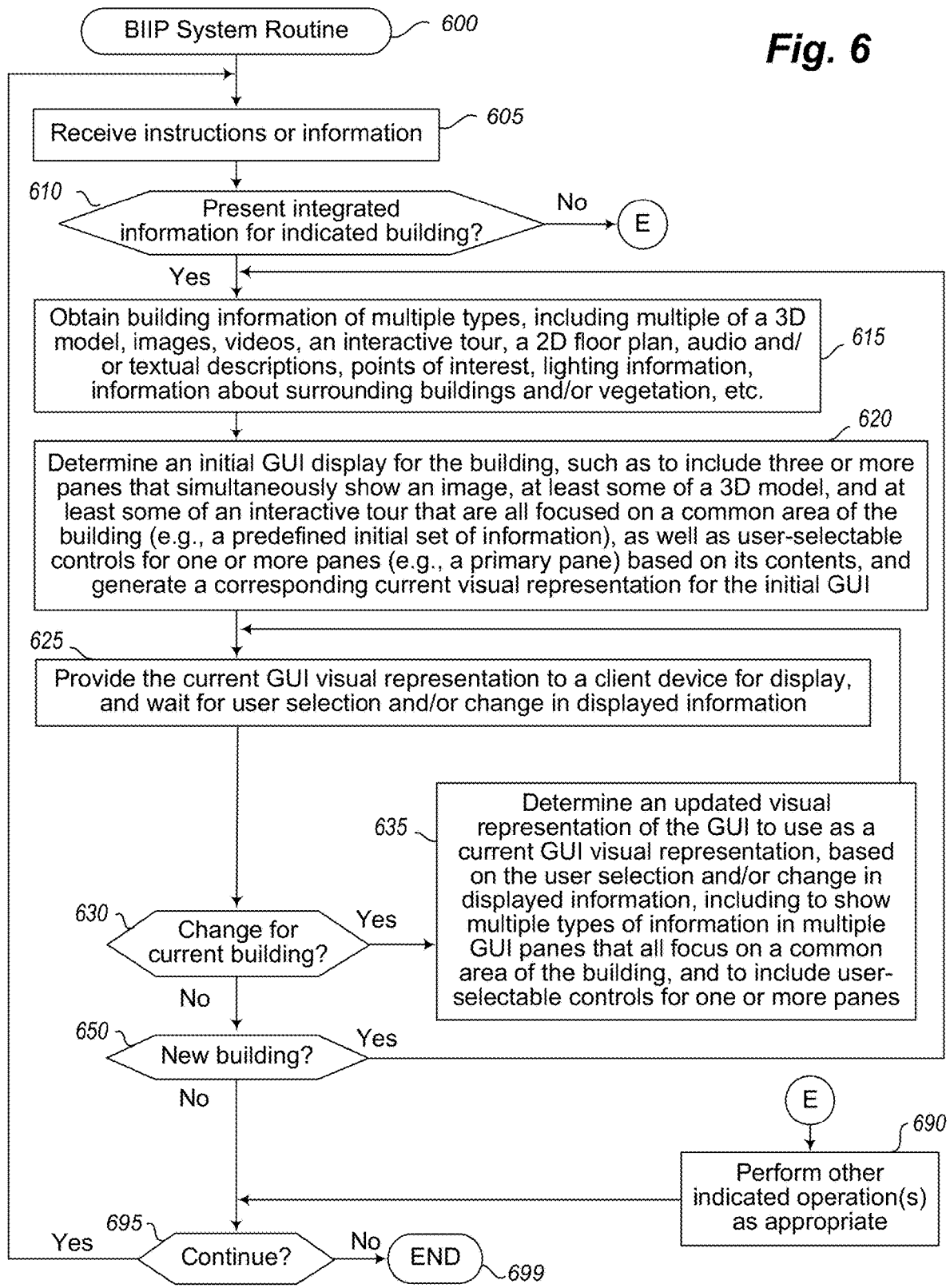
FIG. 6 illustrates an example embodiment of a flow diagram for a Building Information Integrated Presentation (BIIP) system routine in accordance with an embodiment of the present disclosure.

FIG. 6 illustrates an example embodiment of a flow diagram for a Building Information Integrated Presentation (BIIP) system routine 600. The routine may be performed by, for example, execution of the BIIP system 140 of FIG. 1A, the BIIP system 340 of FIG. 3, and/or a BIIP system as discussed with respect to FIGS. 1B-2L and/or as described elsewhere herein, such as to generate and present a GUI that simultaneously displays multiple types of information about a building in an integrated and coordinated manner. In the example of FIG. 6, the GUI uses multiple panes to simultaneously present multiple types of information in an integrated and coordinated manner, but in other embodiments, other types of GUIs with other types of structures and layouts may be used to present the same or similar types of information, as discussed elsewhere herein.

The illustrated embodiment of the routine begins in block 605, where information or instructions are received. The routine continues to block 610 to determine whether the instructions in block 605 are to present integrated information for an indicated building, such as in a corresponding GUI. If so, the routine continues to perform blocks 615-650, and otherwise continues to block 690. In particular, if it is determined in block 610 that the instructions received in block 605 are to present integrated information for an indicated building, the routine continues to block 615 to obtain building information of multiple types for the indicated building, such as a 3D model of the building, images of the interior (and optionally, exterior) of the building, videos of the interior (and optionally, exterior) of the building, information about an interactive tour of a plurality of viewing/capture locations within the building interior (and optionally, exterior) at which image and/or other information was captured, a 2-D floor plan, audio and/or textual descriptions of particular locations or areas (e.g., rooms, points of interest, etc.), simulated and/or actual lighting information, information about surrounding buildings and/or vegetation and/or other exterior aspects (vehicle traffic, foot traffic, noises, etc.), surfaces and/or areas available for virtual staging or otherwise for adding virtual objects, etc.

After block 615, the routine continues to block 620 to determine an initial GUI display for the building (e.g., to retrieve a preexisting initial GUI to be used; to retrieve predefined information to add to the GUI; to generate the initial GUI, such as from one or more selections made in the instructions received in block 605; etc.), such as a GUI with three or more separate panes that simultaneously show at least three types of information about the building in a coordinated manner. In at least some embodiments, the at least three types of information may include one or more images and/or videos, at least some of the 3D computer model, at least some of an interactive tour, etc., such as with all of the information focused on a common location or other area of the building or other common feature or aspect. The GUI may further include various user-selectable controls (e.g., user-modifiable controls in which the user may modify a value or select from multiple options, other user-selectable controls in which functionality is toggled on and off or otherwise invoked upon selection, etc.) for display to an end user, such as within one or more of the separate panes or instead in separate areas of the GUI (e.g., at the top, at the bottom, on the left and/or right edges, etc.)—in at least some embodiments and situations, some or all of the user-selectable controls may be selected contextually based on other information that is displayed in the GUI, such as to have a primary pane (e.g., that is larger than other secondary page)

and to overlay the content shown in the primary pane with one or more user-selectable controls that are specific to that type of content. If the GUI is to be displayed on the same computer that is executing the routine 600, the routine further generates a visual representation to supply to one or more display devices or other output devices of that computer, and otherwise generates a visual representation for transmission to another client device on which the visual representation of the GUI will be displayed. After block 620, the routine continues to block 625 to provide the generated GUI visual representation to the computer device on which it will be displayed, and then waits for an event to trigger a change in the GUI (e.g., a user selection to modify the displayed information, a change in the underlying displayed information, an amount of time having elapsed since a last user input and/or a last display activity by the routine, etc.).

After block 625, the routine continues to block 630 to determine whether the event that has occurred with respect to block 625 indicates a change in the information to be displayed for the current building, and if so continues to block 635 to determine an updated visual representation of the GUI to use as a new current GUI visual representation with the changed information, and then returns to block 625 to initiate display of the updated visual representation. The change may occur, for example, based on a user selection (e.g., of a user-selectable control in the displayed GUI) and/or a change in the underlying displayed information. In at least some embodiments and situations, the updated visual representation again shows multiple types of information in multiple GUI panes that all focus on a common area, location or other aspect of the building (whether the same common area, location or other aspect, or instead a different one) and that further include user-selectable controls corresponding to one or more panes of the GUI—in other embodiments and situations, information displayed in the GUI at a given time may include all or substantially all of the displayed area of the GUI, such as in a single pane and optionally being of a single type. If it is instead determined in block 630 that the event that occurred with respect to block 625 did not cause a change in displayed information for the current building, the routine continues to block 650 to determine whether the event instead indicates to display information for a new building, and if so the routine returns to block 615 to initiate a display of information for the new building in an updated version of the GUI.

If it is instead determined in block 610 that the instructions or information received in block 605 are not to present integrated information for an indicated building, the routine continues instead to block 690 to perform one or more other indicated operations as appropriate. Such other operations may include, for example, receiving and responding to requests for previously generated GUI information and/or for underlying information that may be used in a GUI, obtaining and storing information about buildings for use in later GUI presentation operations (e.g., information from external sources, such as one or more databases; information from end users, such as questions about an indicated building and/or an answer to an existing question and/or images or other media captured in or around a building; etc.), performing automated analysis of available building information and/or activities of one or more end users to determine patterns or otherwise identify additional information for subsequent use, etc.

After block 690, or if it is instead determined in block 650 that the event is not to display information for a new building, the routine continues to block 695 to determine whether to continue, such as until an explicit indication to terminate is received. If it is determined to continue, the routine returns to block 605 to wait for and receive additional instructions or information, and otherwise continues to block 699 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

receiving, by a computing system, a request to display, to a user, information of multiple types about an interior of a house having multiple rooms;

displaying, by the computing system and to the user, a graphical user interface ("GUI") having a primary pane and at least two secondary panes to simultaneously display at least three types of information about the interior of the house in a coordinated manner along with multiple user-selectable controls that modify information shown in the displayed GUI, wherein the primary pane and one of the secondary panes include a display of multiple images of the interior and of an interface to an interactive tour of a plurality of viewing locations in the interior that shows one or more user-selectable visual indicators of one or more of the viewing locations, and wherein an additional one of the secondary panes includes a display of a three-dimensional model of the house that visually indicates a location in the interior from which the multiple images were captured;

receiving, by the computing system, and via one or more interactions by the user with one or more of the displayed user-selectable controls, instructions to change information displayed in the primary pane to one or more additional images captured at a specified location in the interior;

determining, by the computing system, a portion of the three-dimensional model that includes the specified location, and one of the plurality of viewing locations that is associated with the specified location; and displaying, by the computing system and in response to the received instructions, updated information in the displayed GUI in the coordinated manner that includes the one or more additional images in the primary pane, at least the portion of the three-dimensional model in the additional one secondary pane with a visual indication of the specified location, and a user-selectable visual indicator in the interface to the interactive tour in the one secondary pane that represents the one viewing location.

2. The computer-implemented method of claim 1 wherein the displaying of the one or more additional images in the primary pane includes displaying multiple images in sequence as part of at least one of a video or an animation.

3. The computer-implemented method of claim 1 wherein the displaying of the one or more additional images in the primary pane includes displaying a single image captured at the specified location, and wherein the method further comprises, after the displaying of the updated information in the displayed GUI:

receiving, by the computing system, and via one or more additional interactions by the user with one or more user-selectable controls shown in the displayed GUI, additional instructions to overlay one or more specified further types of information on the displayed single image in the primary pane, wherein the one or more specified further types of information includes at least one of one or more user-selectable visual indications of one or more specified points of interest shown in the displayed single image, or a textual description of an area of the interior shown in the displayed single image, or an audio description of the area of the interior shown in the displayed single image, or an audio recording captured at the area of the interior shown in the displayed single image, or simulated lighting in the area of the interior shown in the displayed single image for one or more specified conditions, or actual lighting recorded in the area of the interior shown in the displayed single image under multiple specified conditions; and presenting, by the computing system and in response to the received additional instructions, further updated information in the displayed GUI that includes overlaying the one or more specified further types of information on the displayed single image in the primary pane.

4. A computer-implemented method comprising:

receiving, by a computing system, a request to display to a user a graphical user interface (GUI) that has information about an interior of an indicated building having multiple rooms;

determining, by the computing system, a location in one of the multiple rooms to highlight in the displayed GUI;

selecting, by the computing system, at least three types of information about the determined location to simultaneously show in the displayed GUI, wherein the at least three types of information include at least a portion of a three-dimensional model of the indicated building that shows at least some of the one room, and include at least a portion of an interface for an interactive tour of a plurality of viewing locations in the interior of the indicated building that shows at least some of the one room with one or more visual indicators of one or more viewing locations of the plurality, and include at least one of an image showing the determined location or a video showing the determined location; and presenting, by the computing system and to the user, the selected at least three types of information simultaneously in at least three separate panes of the displayed GUI along with multiple user-selectable controls that modify information shown in the displayed GUI, including to display the at least portion of the three-dimensional model in a first pane of at least three separate panes, and to display the at least portion of the interactive tour interface in a second pane of the at least three separate panes, and to display the at least one of the image or the video in a third pane of the at least three separate panes.

5. The computer-implemented method of claim 4 further comprising:

receiving, by the computing system, and via one or more user interactions with the displayed GUI, instructions to replace one or more of the selected at least three types of information in one or more of the at least three separate panes with additional information of one or more other types;

selecting, by the computing system, the additional information to display in the one or more panes to coordinate with other information to be displayed in other of the at least three separate panes; and presenting, by the computing system, and to the user via the displayed GUI in response to the received instructions, updated information that includes at least the selected additional information in the one or more panes and that includes the other information in the other of the at least three separate panes.

6. The computer-implemented method of claim 5 wherein the at least three separate panes include multiple secondary panes and a primary pane that is larger than the multiple secondary panes, wherein the instructions to replace the one or more types of information in the one or more panes with additional information of one or more other types include instructions to replace information in the primary pane with existing information of an other type that is currently shown in one of the secondary panes, and wherein the presenting of the updated information includes presenting the existing information of the other type in the primary pane to replace previous information in the primary pane.

7. The computer-implemented method of claim 6 wherein the selecting of the additional information to display in the one or more panes includes selecting further information, which was not shown in the displayed GUI at a time of the user interactions with the displayed GUI, to display in the one secondary pane to replace the existing information that was shown in the one secondary pane, the selecting of the further information including determining further information related to the determined location.

8. The computer-implemented method of claim 4 wherein the at least three separate panes include multiple secondary panes and a primary pane that displays an image of the determined location, and wherein the method further comprises:

receiving, by the computing system, and via one or more user interactions with the displayed GUI, instructions to change the image displayed in the primary pane to another image of another location associated with the indicated building; and selecting, by the computing system, further information to display in the multiple secondary panes about the another location to coordinate with the another image to be displayed in the primary pane; and presenting, by the computing system, and to the user via the displayed GUI, updated information that includes at least the another image in the primary pane and the selected further information in the multiple secondary panes.

9. The computer-implemented method of claim 8 wherein the image displayed in the primary pane of the determined location is a view that is a subset of a panorama image, and wherein the one or more user interactions include selecting a different view that is a new subset of the panorama image corresponding to the another image and that displays a different location in the one room.

10. The computer-implemented method of claim 4 wherein the at least three separate panes include multiple secondary panes and a primary pane that displays the at least portion of the interactive tour interface, wherein the displayed at least portion of the interactive tour interface includes visual information captured at a first viewing location of the plurality in the one room and further includes a user-selectable visual indicator representing a second viewing location in another room of the multiple rooms, and wherein the method further comprises:

receiving, by the computing system, and via one or more user interactions with the user-selectable visual indicator in the displayed GUI, instructions to change information displayed in the primary pane to additional information captured at the second viewing location in the another room; and selecting, by the computing system, further information to display in the multiple secondary panes about the another room to coordinate with the additional information to be displayed in the primary pane; and presenting, by the computing system, and to the user via the displayed GUI, updated information that includes at least the additional information in the primary pane and the selected further information in the multiple secondary panes.

11. The computer-implemented method of claim 4 wherein the at least three separate panes include multiple secondary panes and a primary pane that is larger than the multiple secondary panes, and wherein the method further comprises:

receiving, by the computing system, and via one or more user interactions with one or more of the user-selectable controls in the displayed GUI, instructions to overlay one or more further types of information in at least the primary pane; and presenting, by the computing system, and to the user via the displayed GUI in response to the received instructions, updated information that includes at least one of the one or more further types of information overlaid on existing information that was shown in the primary pane at a time of the one or more user interactions.

12. The computer-implemented method of claim 11 wherein the one or more further types of information include at least one of one or more user-selectable visual indications of one or more specified points of interest associated with the determined location, or a textual description of an area of the interior associated with the determined location, or an audio description of the area of the interior associated with the determined location, or an audio recording captured at the area of the interior associated with the determined location, or simulated lighting in the area of the interior associated with the determined location for one or more specified conditions, or actual lighting recorded in the area of the interior associated with the determined location under at least one specified condition, or one or more virtual objects added in the area of the interior associated with the determined location, or one or more changes made to one or more identified surfaces in the area of the interior associated with the determined location, and wherein the received instructions identify the at least one further type of information that is overlaid on the existing information in the primary pane.

13. The computer-implemented method of claim 12 wherein the presenting of the at least one further type of information in the primary pane includes displaying at least one of a video or an animation to show changes in the at least one further type of information at multiple times.

14. The computer-implemented method of claim 11 further comprising selecting, by the computing system, one or more of the multiple user-selectable controls to be displayed in the primary pane based at least in part on a type of information displayed in the primary pane, and wherein the one or more user interactions occur with at least one of the one or more user-selectable controls displayed in the primary pane.

15. The computer-implemented method of claim 4 wherein the selecting of the at least three types of information includes adding, to the at least portion of the three-dimensional model of the indicated building that shows at least some of the one room, visual information identifying a location and orientation of capturing the at least one of the image showing the determined location or the video showing the determined location.

16. The computer-implemented method of claim 4 further comprising, before the receiving of the request to display the GUI that has information about the interior of the indicated building:

displaying, by the computing system, the GUI to the user with initial information about the indicated building and with one or more initial user-selectable controls; and receiving, by the computing system, and via one or more interactions by the user with the one or more initial user-selectable controls, information from the user related to the one room, and wherein the determining of the location in the one room to highlight in the displayed GUI is based at least in part on the received information from the user.

17. The computer-implemented method of claim 4 wherein the at least three separate panes include multiple secondary panes and a primary pane that is larger than the multiple secondary panes, wherein the selecting of the at least three types of information about the interior of the indicated building further includes selecting, by the computing system, one or more additional types of information about an environment surrounding an exterior of the building, and wherein the presenting of the selected at least three types of information simultaneously in at least three separate panes of the displayed GUI further includes presenting the one or more additional types of information about the environment surrounding the exterior of the building, including to display at least one of the one or more additional types of information in the primary pane.

18. The computer-implemented method of claim 4 wherein the presenting of the selected at least three types of information by the computing system includes transmitting, by the computing system and over one or more computer networks, the selected at least three types of information to a client computing device of the user for display on the client computing device, and wherein the method further comprises generating, by the computing system and before the display of the at least portion of the three-dimensional model, the three-dimensional model, including:
  obtaining, by the computing system, a plurality of images taken at multiple capture locations within the multiple rooms;
  determining, by the computing system, and for each of the multiple rooms, a room shape of the room by analyzing at least one of the plurality of images whose capture location is within the room;
  arranging, by the computing system, the determined room shapes for the multiple rooms relative to each other based at least in part on connecting inter-room passages between the multiple rooms; and
  generating, by the computing system, and from the arranged determined room shapes, a two-dimensional floor map of the building, and the three-dimensional model of the building's interior based at least in part on estimated height information for walls of at least some of the multiple rooms.

19. A non-transitory computer-readable medium having stored contents that cause one or more computing devices to perform automated operations, the automated operations including at least:
  selecting, by the one or more computing systems, and with respect to a location associated with an indicated building, multiple types of information about the location to simultaneously show to a user in a displayed graphical user interface (GUI), wherein the multiple types of information include at least one of an image or a video showing the location, and include at least a portion of a three-dimensional visual representation of the indicated building that shows the location; and
  providing, by the one or more computing systems, and via the displayed GUI, the selected multiple types of information simultaneously in multiple panes of the displayed GUI, including to display the least one of the image or the video in a first pane of the multiple panes, and to display the at least portion of the three-dimensional visual representation in a second pane of the multiple panes.

20. The non-transitory computer-readable medium of claim 19 wherein the three-dimensional visual representation is a three-dimensional model of the indicated building, wherein the selected multiple types of information include at least three types of information, wherein the multiple panes include a primary pane and one or more secondary panes, and wherein the providing of the selected at least three types of information includes presenting the at least three types of information simultaneously in the primary pane and in multiple secondary panes of the displayed GUI along with user-selectable controls that modify information shown in the displayed GUI, including to display, in a third pane of the multiple panes that is separate from the first and second panes, at least a portion of an interface for an interactive tour of a plurality of viewing locations in the interior of the indicated building that shows the location with one or more visual indicators of one or more viewing locations of the plurality.

21. The non-transitory computer-readable medium of claim 19 wherein the location associated with the indicated building is a first location within a first room of the building, and wherein the stored contents include software instructions that, when executed, cause the one or more computing systems to perform further automated operations including at least:
  receiving, via one or more user interactions with the displayed GUI, instructions to change the at least one of the image or the video in the first pane to at least one of another image of a second location within the first room or another video of the second location; and
  presenting, to the user via the displayed GUI, updated information that includes the at least one of the another image or the another video in the first pane, and that includes an updated view of the three-dimensional visual representation in the second pane having one or more indications of the second location.

22. The non-transitory computer-readable medium of claim 19 wherein the location associated with the indicated building is a first location outside of the building, wherein the portion of the three-dimensional visual representation of the indicated building includes visual representations of locations surrounding at least some of the building, and wherein the stored contents include software instructions that, when executed, cause the one or more computing systems to perform further automated operations including at least:
  receiving, via one or more user interactions with the displayed GUI, instructions to change the at least one of the image or the video in the first pane to at least one of another image of a second location associated with the building or another video of the second location; and
  presenting, to the user via the displayed GUI, updated information that includes the at least one of the another image or the another video in the first pane, and that includes an updated view of the three-dimensional visual representation in the second pane having one or more indications of the second location.

23. The non-transitory computer-readable medium of claim 19 wherein the second pane displaying the at least portion of the three-dimensional visual representation is a primary pane occupying a majority of the displayed GUI, and wherein the stored contents include software instructions that, when executed, cause the one or more computing systems to perform further automated operations including at least:
  receiving, via one or more user interactions with the displayed GUI, instructions to display information about at least one of public spaces for the indicated building or private spaces for the indicated building; and
  presenting, to the user via the displayed GUI, updated information that includes displayed information overlaid on the displayed at least portion of the three-dimensional visual representation in the primary pane, wherein the displayed overlaid information includes visual indications of the at least one of the public spaces or the private spaces within the displayed at least portion of the three-dimensional visual representation in the primary pane.

24. The non-transitory computer-readable medium of claim 19 wherein the second pane displaying the at least portion of the three-dimensional visual representation is a primary pane occupying a majority of the displayed GUI, and wherein the stored contents include software instructions that, when executed, cause the one or more computing systems to perform further automated operations including at least:

receiving, via one or more user interactions with the displayed GUI, instructions to display information about types of rooms of the indicated building using multiple visual icons representing multiple types of rooms; and presenting, to the user via the displayed GUI, updated information that includes displayed information overlaid on the displayed at least portion of the three-dimensional visual representation in the primary pane, wherein the displayed overlaid information includes at least some of the multiple visual icons for rooms of respective types shown in the displayed at least portion of the three-dimensional visual representation in the primary pane.

25. The non-transitory computer-readable medium of claim 19 wherein the second pane displaying the at least portion of the three-dimensional visual representation is a primary pane occupying a majority of the displayed GUI, and wherein the stored contents include software instructions that, when executed, cause the one or more computing systems to perform further automated operations including at least:

receiving, via one or more user interactions with the displayed GUI, instructions to display information about flow patterns of people within the indicated building; and presenting, to the user via the displayed GUI, updated information that includes displayed information overlaid on the displayed at least portion of the three-dimensional visual representation in the primary pane, wherein the displayed overlaid information includes visual indications of the flow patterns within the displayed at least portion of the three-dimensional visual representation in the primary pane.

26. The non-transitory computer-readable medium of claim 19 wherein the second pane displaying the at least portion of the three-dimensional visual representation is a primary pane occupying a majority of the displayed GUI, and wherein the stored contents include software instructions that, when executed, cause the one or more computing systems to perform further automated operations including at least:

receiving, via one or more user interactions with the displayed GUI, instructions to display personalized information that is specific to the user about one or more spaces within the indicated building and that is based at least in part on one or more prior actions of the user; and presenting, to the user via the displayed GUI, updated information that includes displayed information overlaid on the displayed at least portion of the three-dimensional visual representation in the primary pane, wherein the displayed overlaid information includes visual indications of the personalized information for the one or more spaces that are visible within the displayed at least portion of the three-dimensional visual representation in the primary pane.

27. The non-transitory computer-readable medium of claim 19 wherein the second pane displaying the at least portion of the three-dimensional visual representation is a primary pane occupying a majority of the displayed GUI, and wherein the stored contents include software instructions that, when executed, cause the one or more computing systems to perform further automated operations including at least:

receiving, via one or more user interactions with the displayed GUI, instructions to display information about one or more distances within the indicated building that are identified using at least two locations specified by the user within the displayed at least portion of the three-dimensional visual representation in the primary pane;

determining values of the one or more distances for the at least two locations within the indicated building; and presenting, to the user via the displayed GUI, updated information that includes displayed information overlaid on the displayed at least portion of the three-dimensional visual representation in the primary pane, wherein the displayed overlaid information includes visual indications of the determined values of the one or more distances.

28. The non-transitory computer-readable medium of claim 19 wherein the one or more computing systems are part of a building information integrated presentation system, wherein the providing of the selected multiple types of information by the one or more computing systems includes transmitting the selected multiple types of information over one or more computer networks to a client computing device of the user for display in the GUI on the client computing device, and wherein the selecting of the multiple types of information about the location is based at least in part by an interaction of the user with a user-selectable control displayed in the GUI.

29. A system comprising:
one or more hardware processors of one or more computing systems; and
one or more memories with stored instructions that, when executed by at least one of the one or more hardware processors, cause the one or more computing systems to perform automated operations to implement at least some functionality of a building information integrated presentation system, including at least:
selecting, with respect to a location in an interior of an indicated building, multiple types of information about the location to simultaneously show to a user in a displayed graphical user interface (GUI), wherein the multiple types of information include at least one of an image or a video showing the location, and include at least a portion of an interface for an interactive tour of a plurality of viewing locations in the interior of the indicated building that shows the location with one or more visual indicators of one or more viewing locations of the plurality; and
providing, via the displayed GUI, the selected multiple types of information simultaneously in multiple panes of the displayed GUI that include a primary pane and one or more secondary panes, including to display the at least portion of the interface for the interactive tour in the primary pane or in one of the one or more secondary panes, and to display the least one of the image or the video in one of the multiple panes separate from the pane displaying the at least portion of the interface for the interactive tour.

30. The system of claim 29 wherein the providing of the multiple types of information includes presenting at least three selected types of information simultaneously in the primary pane and in multiple secondary panes of the displayed GUI along with user-selectable controls that modify information shown in the displayed GUI, including to display, in an additional secondary pane of the displayed GUI, at least a portion of a three-dimensional model of the indicated building that shows the location.

31. The system of claim 29 further comprising a client computing device of the user, and wherein the automated operations further include receiving by the client computing device and displaying on the client computing device the provided selected multiple types of information, and transmitting, by the client computing device and to the one or more computing systems, information from an interaction of the user with a user-selectable control displayed in the GUI to cause a modification of the selected multiple types of information displayed in the GUI.

* * * * *

UNITED STATES PATENT AND TRADEMARK OFFICE
CERTIFICATE OF CORRECTION

PATENT NO. : 10,825,247 B1
APPLICATION NO. : 16/681787
DATED : November 3, 2020
INVENTOR(S) : Joshuah Vincent et al.

It is certified that error appears in the above-identified patent and that said Letters Patent is hereby corrected as shown below:

In the Claims

Column 33, Line 33, Claim 19:
"stored contents that cause one or more computing devices to" should read --stored contents that cause one or more computing systems to--.

Signed and Sealed this
Eighth Day of December, 2020

Andrei Iancu
*Director of the United States Patent and Trademark Office*